(12) United States Patent
Yamazaki

(10) Patent No.: US 7,616,340 B2
(45) Date of Patent: Nov. 10, 2009

(54) IMAGE PROCESSING METHOD AND APPARATUS, THRESHOLD VALUE MATRIX CREATING METHOD, IMAGE FORMING APPARATUS, SUB-MATRIX CREATING METHOD AND PROGRAM

(75) Inventor: Yoshirou Yamazaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 571 days.

(21) Appl. No.: 11/386,680

(22) Filed: Mar. 23, 2006

(65) Prior Publication Data

US 2006/0214971 A1 Sep. 28, 2006

(30) Foreign Application Priority Data

Mar. 25, 2005 (JP) ............................... 2005-089554

(51) Int. Cl.
*G06K 15/10* (2006.01)
(52) U.S. Cl. ............................ 358/1.8; 347/14; 347/15; 358/3.13; 358/3.16; 358/3.22; 358/466
(58) Field of Classification Search .................. 358/1.9, 358/1.1, 3.06, 3.01; 347/9, 12, 13, 14, 15
See application file for complete search history.

(56) References Cited

U.S. PATENT DOCUMENTS 5,528,270 A * 6/1996 Tajika et al. ................... 347/19

(Continued)

FOREIGN PATENT DOCUMENTS

| JP | 2004-202795 A | 7/2004 |
| JP | 2004-202927 A | 7/2004 |

*Primary Examiner*—Benny Q Tieu
*Assistant Examiner*—Paul F Payer
(74) *Attorney, Agent, or Firm*—Birch, Stewart, Kolasch & Birch, LLP

(57) ABSTRACT

The image processing method comprises: a recording failure position determination step of determining a recording failure position on an image corresponding to a malfunctioning recording element; a basic threshold value matrix storage step of storing a basic threshold value matrix set with threshold values used for halftoning of converting multiple-value input image data into dot data of a number of tonal graduations smaller than that of the multiple-value input image data by quantizing the multiple-value input image data; a sub-matrix storage step of storing a plurality of sub-matrices in association with recording failure positions in the basic threshold value matrix, each of the sub-matrices being set with threshold values which are substituted for the threshold values in a partial region of the basic threshold value matrix, the partial region including a pixel position corresponding to the recording failure position and having a width of a prescribed number of pixels; a replacement region determination step of determining a corresponding region with the width of the prescribed number of pixels including the recording failure position in the basic threshold value matrix, according to the pixel position in the input image data and the recording failure position determined in the recording failure position determination step; a sub-matrix selection step of selecting one of the sub-matrices stored in the sub-matrix storage step to use for substituting for the corresponding region determined in the replacement region determination step; a threshold value replacement step of creating a reformed threshold value matrix by replacing the threshold values of the corresponding region including the recording failure position in the basic threshold value matrix, with the one of the sub-matrices selected in the sub-matrix selection step; and a quantization processing step of quantizing the input image data by selectively using the basic threshold value matrix and the reformed threshold value matrix.

16 Claims, 23 Drawing Sheets

U.S. PATENT DOCUMENTS

| | | | | |
|---|---|---|---|---|
| 5,946,006 | A * | 8/1999 | Tajika et al. | 347/19 |
| 6,356,363 | B1 * | 3/2002 | Cooper et al. | 358/1.9 |
| 7,275,801 | B2 * | 10/2007 | Chiwata | 347/19 |
| 2003/0081259 | A1 * | 5/2003 | Toyoda et al. | 358/3.16 |
| 2004/0104951 | A1 * | 6/2004 | Shibata et al. | 347/14 |
| 2004/0218221 | A1 * | 11/2004 | Hirano et al. | 358/3.06 |

* cited by examiner

FIG.3

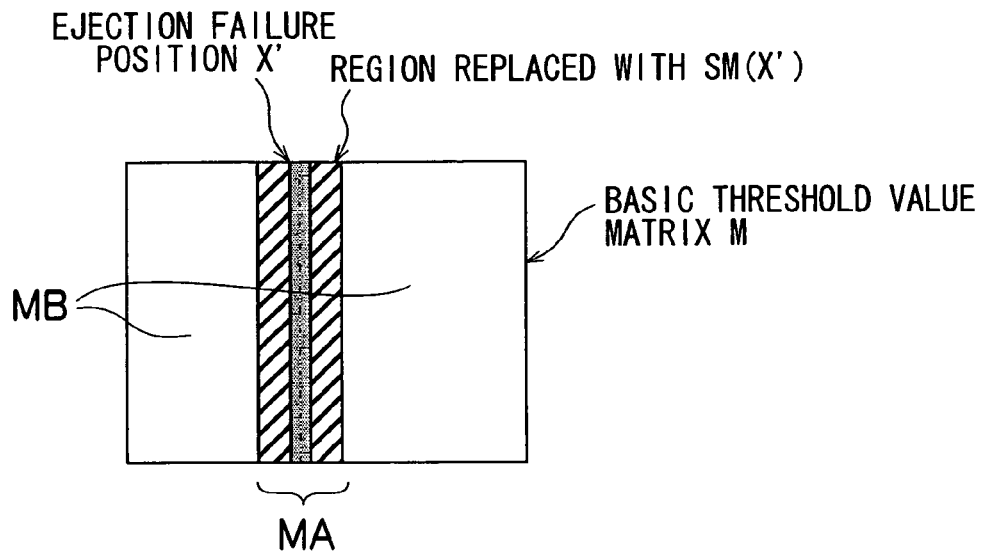

EJECTION FAILURE POSITION X'
REGION REPLACED WITH SM(X')
BASIC THRESHOLD VALUE MATRIX M
MB
MA

FIG.4

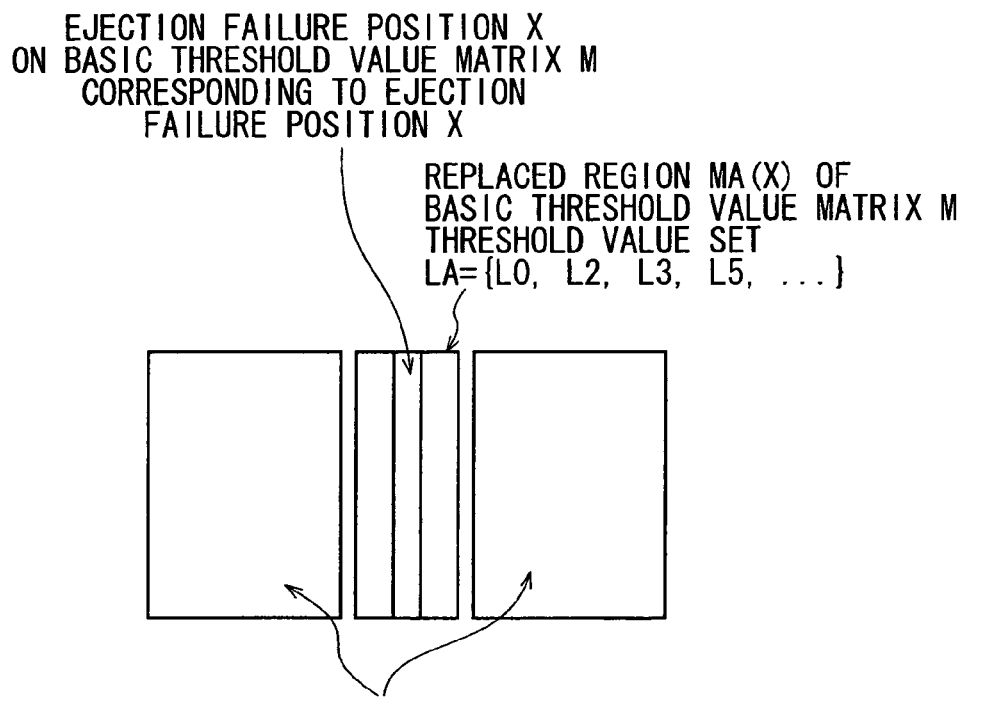

EJECTION FAILURE POSITION X ON BASIC THRESHOLD VALUE MATRIX M CORRESPONDING TO EJECTION FAILURE POSITION X

REPLACED REGION MA(X) OF BASIC THRESHOLD VALUE MATRIX M
THRESHOLD VALUE SET
LA={L0, L2, L3, L5, ...}

NON-REPLACED REGION MB(X) OF BASIC THRESHOLD VALUE MATRIX M
THRESHOLD VALUE SET LB={L1, L4, L7, ...}

· THRESHOLD VALUE SET OF BASIC THRESHOLD VALUE MATRIX M
　LM = LA ∪ LB = {L0, L1, L2, L3, ...}

FIG.5

EJECTION FAILURE POSITION X
IN BASIC THRESHOLD VALUE MATRIX M
CORRESPONDING TO EJECTION FAILURE POSITION X

DOT ARRANGEMENT DMA(X, L)
OF REPLACED REGION MA(X)
IN BASIC THRESHOLD
VALUE MATRIX M

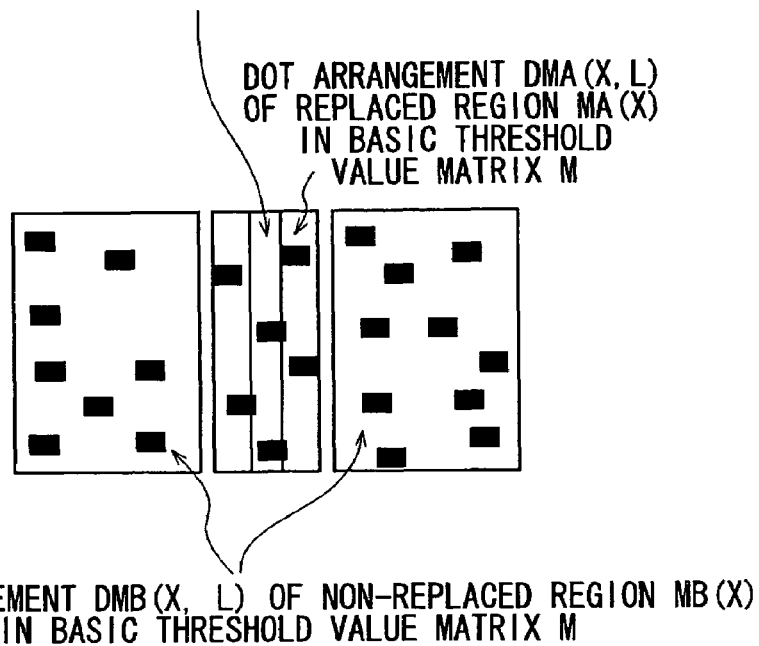

DOT ARRANGEMENT DMB(X, L) OF NON-REPLACED REGION MB(X)
IN BASIC THRESHOLD VALUE MATRIX M

FIG.6

EJECTION FAILURE ROSITION X
IN BASIC THRESHOLD VALUE MATRIX M
CORRESPONDING TO EJECTION FAILURE POSITION X

DOT ARRANGEMENT DSM(X, L)
OF EJECTION FAILURE
COUNTERMEASURE SUB-MATRIX SM(X)

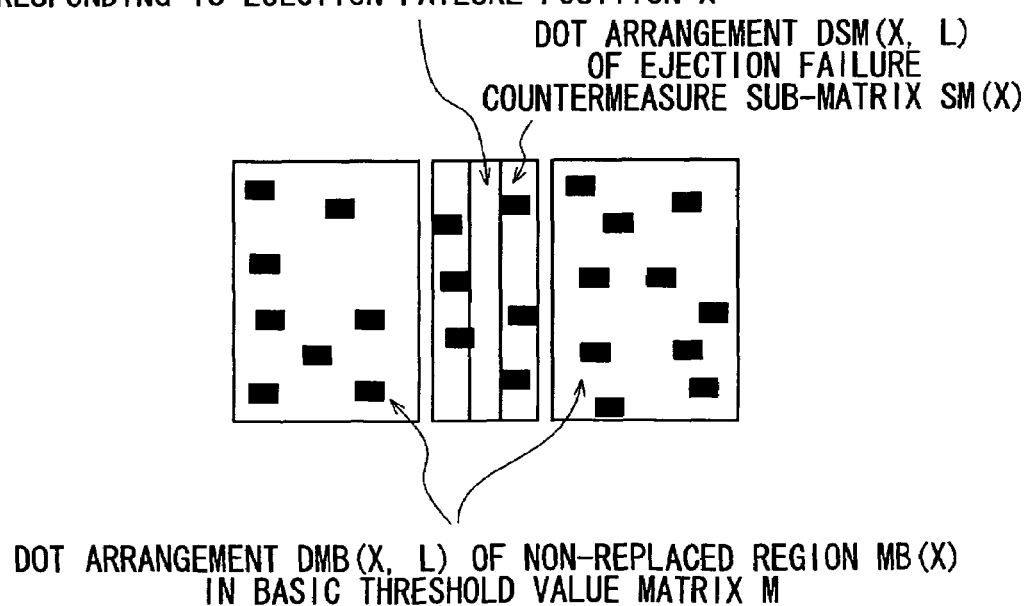

DOT ARRANGEMENT DMB(X, L) OF NON-REPLACED REGION MB(X)
IN BASIC THRESHOLD VALUE MATRIX M

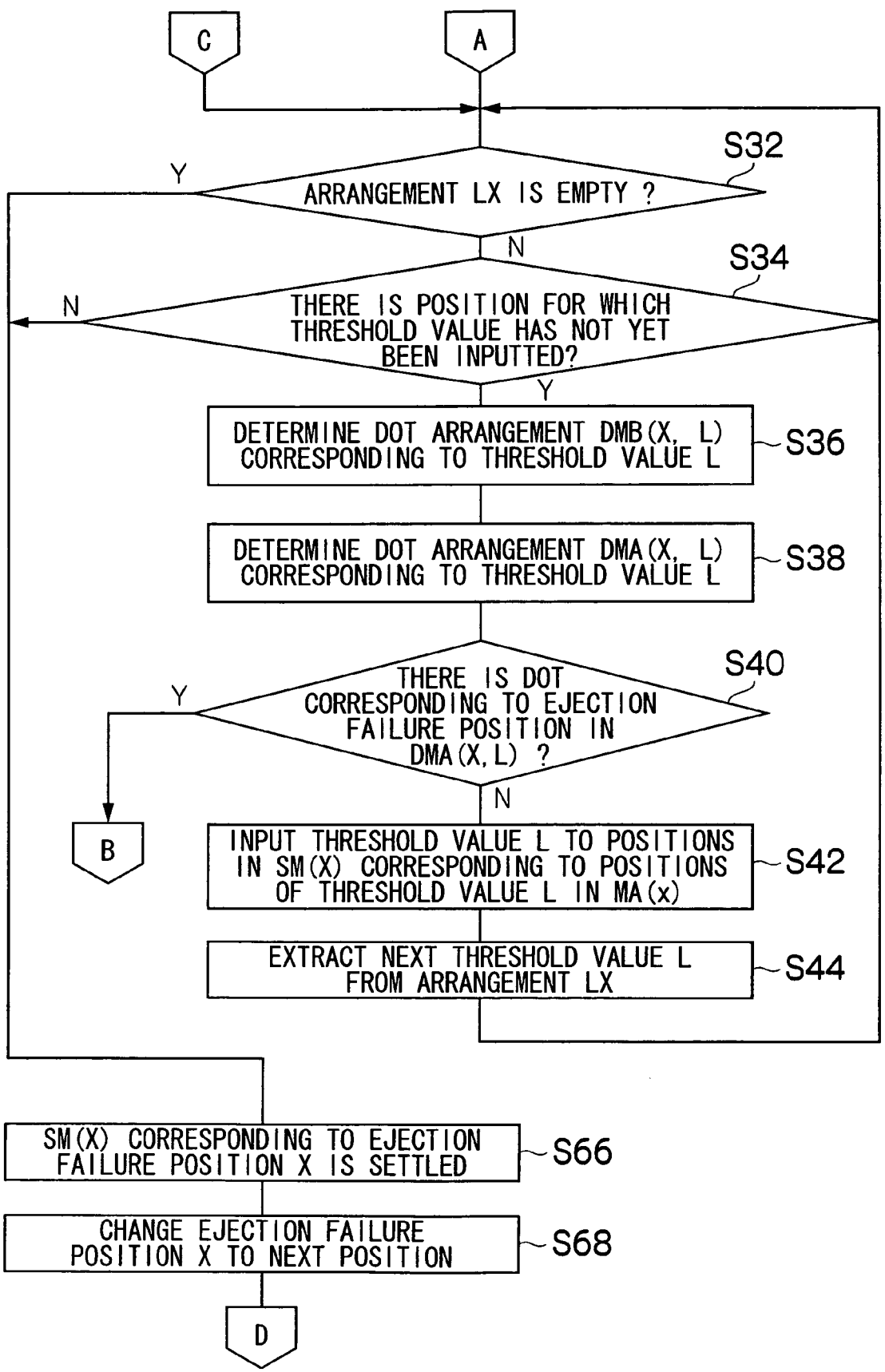

FIG.9

- SETTLE DOT ARRANGEMENT DSM(X, L-1) CORRESPONDING TO THRESHOLD VALUE L-1 — S50
- USING PRESCRIBED DOT MODEL, DETERMINE DENSITY DISTRIBUTION DDM OF DOT ARRANGEMENT DM COMPOSED OF DSM(X, L-1) AND DMB(X, L) — S52
- CREATE DENSITY HISTOGRAM HDDM FOR DDM PROCESSED WITH SPATIAL FILTER BASED ON VISUAL CHARACTERISTICS — S54
- FROM DDM PROCESSED WITH SPATIAL FILTER BASED ON VISUAL CHARACTERISTICS, EXTRACT CANDIDATE POSITIONS SATISFYING CONDITIONS OF BEING WITHIN DSM REGION, NOT YET HAVING THRESHOLD VALUE INPUTTED, AND BEING WITHIN PRESCRIBED NUMBER OF PIXELS FROM MINIMUM DENSITY IN DENSITY HISTOGRAM HDDM (IN CASE OF MULTIPLE-VALUE DATA (WHERE DOT SIZE IS VARIABLE), POSITIONS WHERE THRESHOLD VALUE HAS NOT YET BEEN INPUTTED FOR AT LEAST ONE OF TONAL GRADUATION VALUES (DOT SIZES)) — S56
- SETTLE DOT ARRANGEMENT DM'(i) IN CASE WHERE TONAL GRADUATION VALUES (DOT SIZES) APPLICABLE AT EXTRACTED POSITIONS ARE ADDED TO DM (INCLUDING CHANGE OF TONAL GRADUATION VALUE IN CASE OF MULTIPLE-VALUE DATA) (WHERE, i IS SUFFIX CORRESPONDING TO EXTRACTED POSITION). DETERMINE CORRESPONDING DENSITY DISTRIBUTION DDM'(i) BY USING PRESCRIBED DOT MODEL. — S58
- OBTAINING EVALUATION VALUE EDDM'(i) BY EVALUATING DDM'(i) WITH RESPECT TO GRANULARITY AND ANISOTROPY (ARTIFACTS) BASED ON VISUAL CHARACTERISTICS — S60
- SELECT POSITION HAVING BEST EVALUATION VALUE, OF EDDM'(i) VALUES CORRESPONDING TO EXTRACTED POSITIONS, AND INPUT THRESHOLD VALUE L TO THAT POSITION — S62
- EXTRACT NEXT THRESHOLD VALUE L FROM ARRANGEMENT LX — S64

REGION REPLACED WITH SM(X')

M'

BASIC THRESHOLD VALUE MATRIX M

END REGION ME

EJECTION FAILURE POSITION X'

CONVERT TO BASIC THRESHOLD VALUE MATRIX M' WHERE END REGION ME OF BASIC THRESHOLD VALUE MATRIX M HAS MOVED

RADIALLY AVERAGE 0   1/2   1/√2

RADIAL FREQUENCY $f_r$

R. A. P. S.
(RADIALLY AVERAGED POWER SPECTRUM)

RADIAL FREQUENCY $f_r$

VISUAL CHARACTERISTICS (VTF)

FIG.22A 150 (112K, 112C, 112M, 112Y)
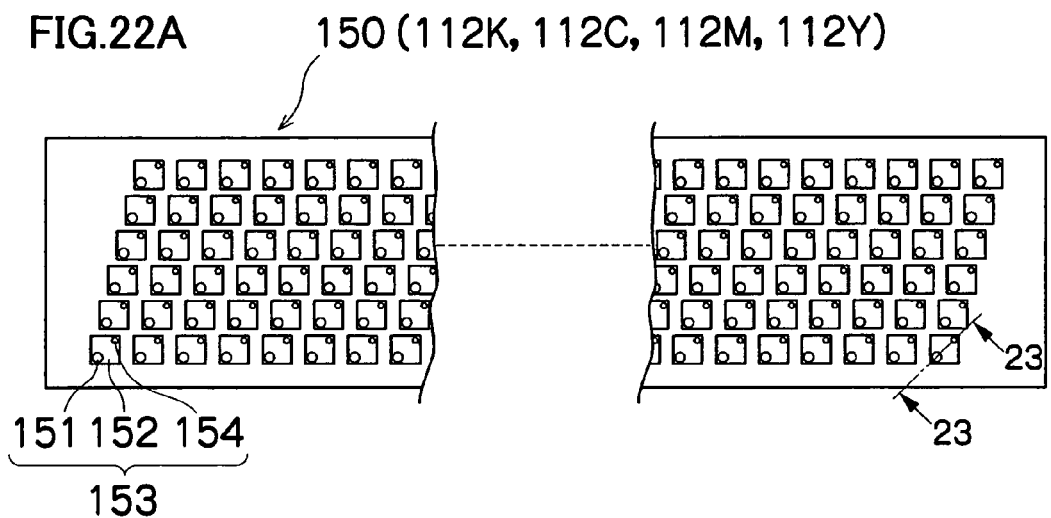
151 152 154
153
FIG.22B
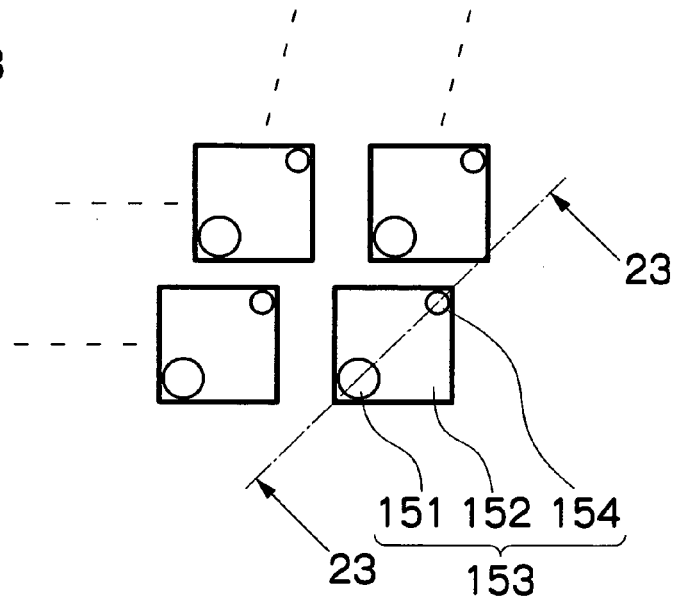
151 152 154
153
FIG.22C
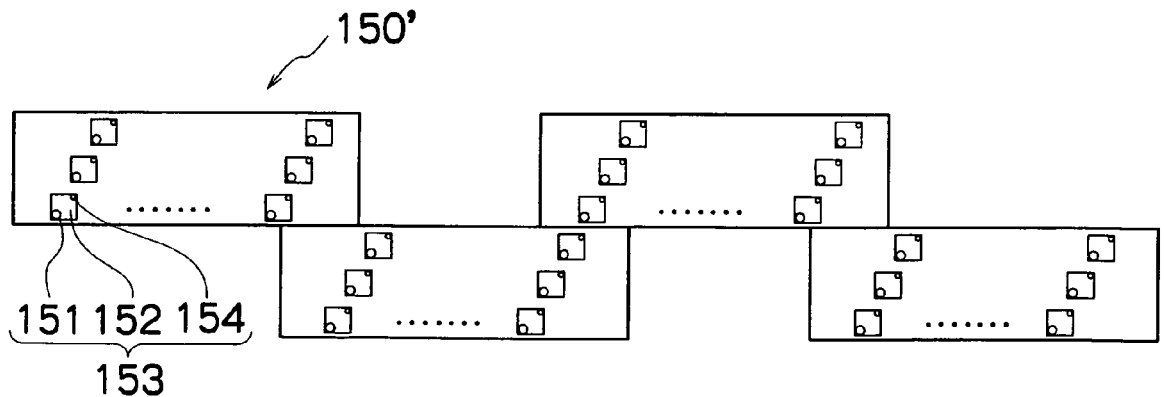
151 152 154
153

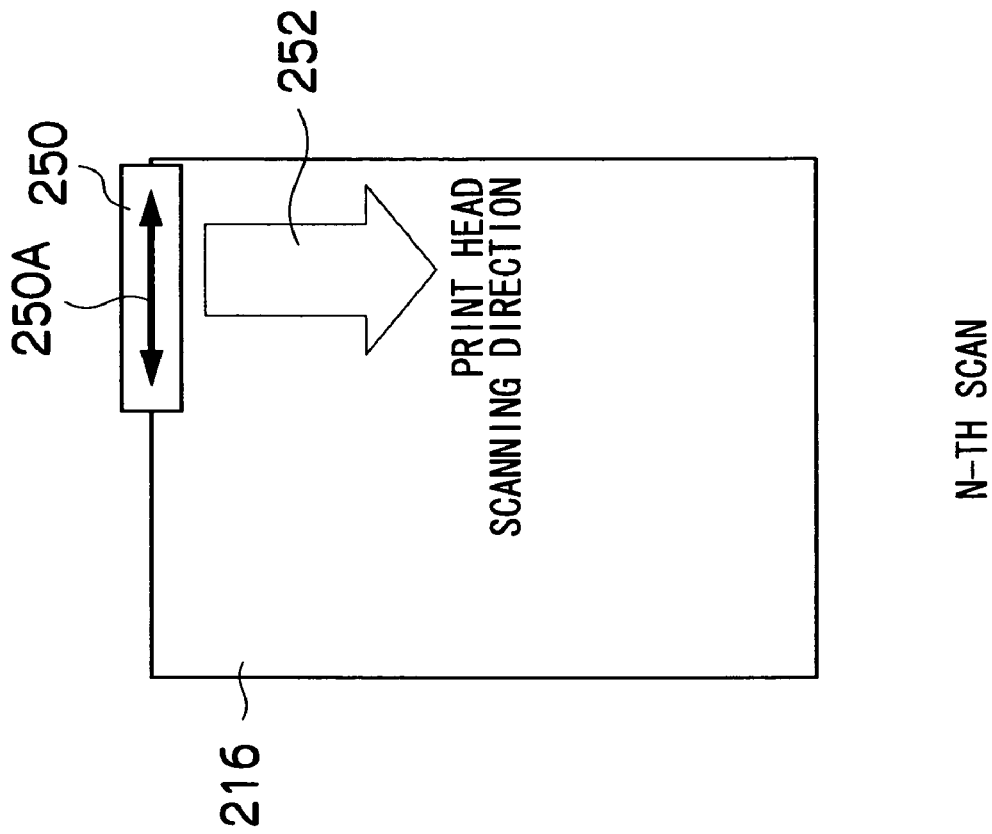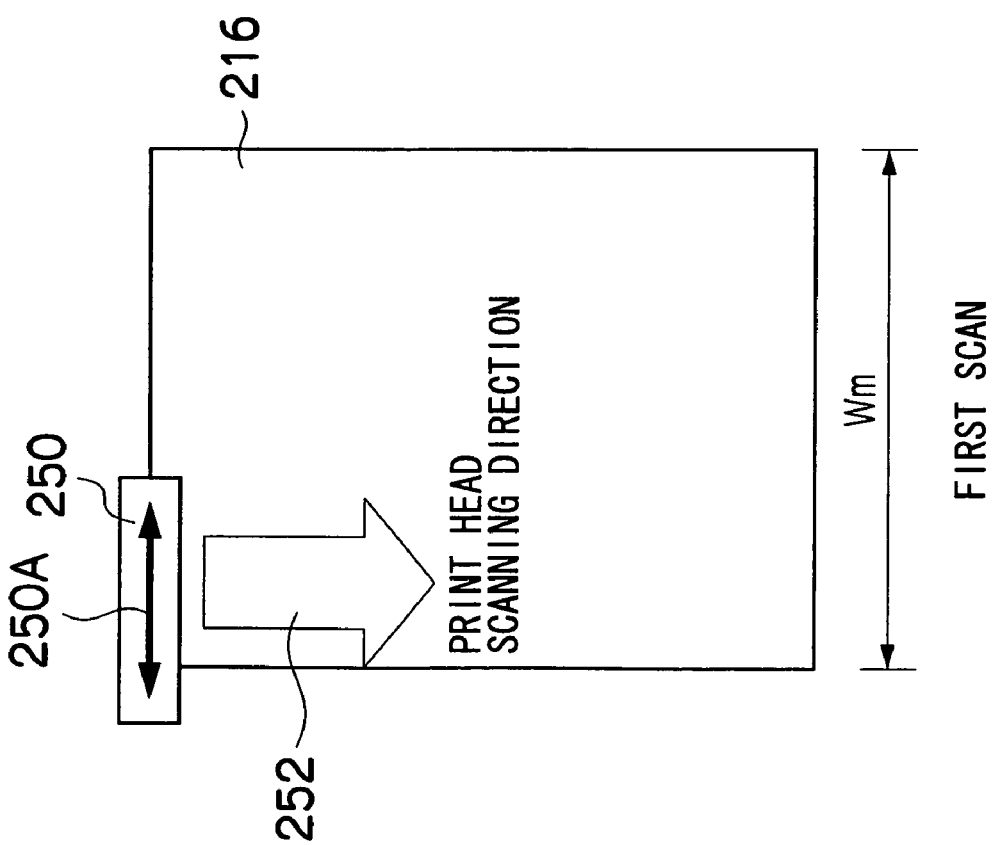

IMAGE PROCESSING METHOD AND APPARATUS, THRESHOLD VALUE MATRIX CREATING METHOD, IMAGE FORMING APPARATUS, SUB-MATRIX CREATING METHOD AND PROGRAM

BACKGROUND OF THE INVENTION

1. Field of the Invention

The present invention relates to an image processing method and apparatus, a threshold value matrix creating method, an image forming apparatus and a sub-matrix creating method and program, and more particularly, to image processing technology suitable for a halftoning process whereby image defects caused by ink ejection failures in an inkjet printer are made to be inconspicuous.

2. Description of the Related Art

In an inkjet printer, for a variety of reasons, a situation may occur in which it becomes impossible to eject ink from a nozzle. For example, when a particular nozzle in a group of nozzles fails to eject or malfunctions, the dots that should have originally been deposited by the nozzle are missing, which results in unintended flaws in the form of lines (streaking) in the recorded image on the recording medium, and this streaking is extremely conspicuous.

In particular, in the case of a device composition which completes printing by means of a single sub-scanning operation (a single pass method), using a line-type recording head in which a plurality of nozzle are arranged, it is difficult to cover the droplet deposition position of a malfunctioning nozzle suffering an ejection failure, by means of another nozzle (in other words, a so-called "shingling" operation), and streaking non-uniformity due to malfunctioning nozzles suffering an ejection failure is highly notable, leading to serious deterioration in image quality. Therefore, a method has been proposed by which, if any of the nozzles is suffering an ejection failure, deterioration in image quality caused thereby is made to be inconspicuous.

Japanese Patent Application Publication No. 2004-202795 discloses technology for an inkjet printer in which a normal dithering matrix and a dithering matrix corresponding to ejection failure are prepared in order to that blanking out caused by ejection failure does not become conspicuous, the dithering matrices being used selectively on the basis of ejection failure position information.

Furthermore, Japanese Patent Application Publication No. 2004-202927 discloses technology which changes the combination of recording dots in such a manner that ejection is performed by other recording elements, instead of recording dots deposited by malfunctioning recording elements suffering an ejection failure.

However, the technology which changes the nozzles to a combination which does not include malfunctioning nozzles as disclosed in Japanese Patent Application Publication No. 2004-202795 has a drawback in that, if there are a plurality of malfunctioning nozzles within a dithering matrix, then it becomes necessary to provide dithering matrices in accordance with the number of combinations of the nozzles, and the storage volume of all of the dithering matrix data becomes extremely large. Furthermore, technology which changes the combination of dots as disclosed in Japanese Patent Application Publication No. 2004-202927 is not compatible with cases where dithering matrices having a size of 2×2 pixels or above are used, since the number of combinations involved is enormous.

In general, dot image of high quality is obtained if the input image is quantized by using a threshold value matrix of a large size, typically, a blue noise mask (for example, 256 (columns)×256 (rows) of pixels, or 512 (columns)×512 (rows) of pixels, or the like). If the technology disclosed in Japanese Patent Application Publication No. 2004-202795 is used with the object of reducing streak-shaped artifacts caused by ejection failures when using a blue noise mask of this kind (i.e., technology which previously prepares a plurality of threshold value matrices corresponding to malfunctioning nozzles and switches the matrices in accordance with the ejection failure positions), then supposing that this technology is applied to threshold value matrices of a large size (for example, M=N×N), the number of threshold value matrices prepared for use in switching to correspond to ejection failures will be of the order of M×N (where M is the matrix size and N corresponds to the ejection failure positions contained in the threshold value matrix), in other words, N×N×N ($N^3$), and consequently, an enormous storage volume is required for all of the threshold value matrices corresponding to ejection failures.

In the case of one ejection failure, the number of matrices is of the order of $N^3$ as described above, and supposing that two or more ejection failures occur within one matrix, then it can be seen readily that matrices of the order of $N^4$ will be required. If the threshold value matrix size is reduced, then the storage volume is reduced accordingly, but in this case, it is not possible to use a blue noise mask, and hence high image quality can not be obtained.

SUMMARY OF THE INVENTION

The present invention has been contrived in view of the foregoing circumstances, an object thereof to be to provide an image processing method, program and apparatus, a threshold value matrix creating method and program, an image forming apparatus, and a sub-matrix creating method and program, whereby both high-quality image formation and recovery to ejection failures (recording failures) can be achieved using a threshold value matrix of relatively large size, such as a blue noise mask, without causing a significant increase in the storage volume.

In order to attain the aforementioned object, the present invention is directed to an image processing method, comprising: a recording failure position determination step of determining a recording failure position on an image corresponding to a malfunctioning recording element; a basic threshold value matrix storage step of storing a basic threshold value matrix set with threshold values used for halftoning of converting multiple-value input image data into dot data of a number of tonal graduations smaller than that of the multiple-value input image data by quantizing the multiple-value input image data; a sub-matrix storage step of storing a plurality of sub-matrices in association with recording failure positions in the basic threshold value matrix, each of the sub-matrices being set with threshold values which are substituted for the threshold values in a partial region of the basic threshold value matrix, the partial region including a pixel position corresponding to the recording failure position and having a width of a prescribed number of pixels; a replacement region determination step of determining a corresponding region with the width of the prescribed number of pixels including the recording failure position in the basic threshold value matrix, according to the pixel position in the input image data and the recording failure position determined in the recording failure position determination step; a sub-matrix selection step of selecting one of the sub-matrices stored in the sub-matrix storage step to use for substituting for the corresponding region determined in the replacement region determination step; a threshold value replacement step of creating a reformed threshold value matrix by replacing the threshold values of the corresponding region including the recording failure position in the basic threshold value matrix, with the one of the sub-matrices selected in the sub-matrix selection step; and a quantization processing step of quantizing the input image data by selectively using the basic threshold value matrix and the reformed threshold value matrix.

The digital image is, for instance, treated as a collection (arrangement) of pixels, the pixel being the minimum information unit, in which a graduated tone value (a value indicating the degree of light or shade) corresponding to the image contents is assigned to each pixel. As a technique for halftoning this original image (input image data having multiple values) and converting it into image data having a smaller number of tonal graduations (binary data or multiple-value dot data which takes account of the dot size), according to the present invention, threshold values (a sub-matrix) for achieving a dot arrangement which reduces the visibility of an image defect caused by a recording failure are beforehand calculated with respect to a region of a prescribed pixel width (a partial region) corresponding to the recording failure position, in the basic threshold value matrix, and a plurality of sub-matrices of this kind are prepared to correspond to differences in the recording failure position. In other words, the threshold values of the sub-matrix are set in such a manner that a dot arrangement of adjacent pixels (pixels within a range of a prescribed number of pixels) is specified, whereby the occurrence of streaking (an artifact) due to omission of dots in the recording failure position is suppressed. Furthermore, the threshold values in the sub-matrix are set in such a manner that, when the sub-matrix is substituted for a portion of the basic threshold value matrix, no artifacts occur in the vicinity of the joints between the replaced region and the non-replaced regions on the reformed threshold value matrix.

The corresponding region on the basic threshold value matrix is determined on the basis of the information relating to the recording failure position as determined in the recording failure position determination step, and this corresponding region is replaced with the stored sub-matrix, and the reformed threshold value matrix thus obtained is used for the halftoning process. Consequently, even if there is a recording element which is not capable of recording, it is possible to obtain an image of high quality which does not contain conspicuous image defects.

Furthermore, since a composition is adopted in which sub-matrices which are substituted for a portion of a basic threshold value matrix are prepared, and these sub-matrices are used selectively in accordance with the region corresponding to the recording failure position, then it is possible to reduce the volume of data that is to be stored, in comparison with a composition in which the whole of the threshold value matrix is changed in accordance with the recording failure position.

In the recording failure position determination step, it is possible to store information relating to recording failure positions beforehand, in a storage device such as a memory, in such a manner that information can be obtained by reading out the required information, or it is possible actually to print a test pattern, or the like, read in and analyze the print results, and thus acquire information relating to recording failure positions.

Here, the concept of "recording failure" is not limited to a state where the actual recording element reaches a state of being unable to record, for any reason, and it may also include situations where the actual recording element has not become incapable of recording, but where, in control terms, a malfunctioning recording element is compulsorily disabled, due to the occurrence of incomplete recording caused by an abnormality in the recording position, an abnormality in the recorded dot shape, or the like.

Preferably, the basic threshold value matrix has blue noise characteristics; and the width of the prescribed number of pixels of the sub-matrices is set in a range of 3 through 9 pixels.

Desirably, as the basic threshold value matrix used in the present invention, a matrix having blue noise characteristics which enable the formation of high-quality images is used. The blue noise mask is designed in such a manner that a visually desirable dot arrangement is obtained with respect to the direct current component of the image. Although the matrix size for the blue noise mask is relatively large (for example, 256 (rows)×256 (columns) of pixels, or 512 (rows)× 512 (columns) of pixels, the total volume of data of the basic threshold value matrix and the sub-matrices combined can be kept to a small volume, since the sub-matrix which is used to replace a portion of the region of the basic threshold value matrix has a small size, being a column of a prescribed number of pixels between 3 and 9 pixels.

In order to attain the aforementioned object, the present invention is also directed to an image processing apparatus, comprising: a recording failure position determination device which determines a recording failure position on an image corresponding to a malfunctioning recording element; a basic threshold value matrix storage device which stores a basic threshold value matrix set with threshold values used for halftoning of converting multiple-value input image data into dot data of a number of tonal graduations smaller than that of the multiple-value input image data by quantizing the multiple-value input image data; a sub-matrix storage device which stores a plurality of sub-matrices in association with recording failure positions in the basic threshold value matrix, each of the sub-matrices being set with threshold values which are substituted for the threshold values in a partial region of the basic threshold value matrix, the partial region including a pixel position corresponding to the recording failure position and having a width of a prescribed number of pixels; a replacement region determination device which determines a corresponding region with the width of the prescribed number of pixels including the recording failure position in the basic threshold value matrix, according to the pixel position in the input image data and the recording failure position determined by the recording failure position determination device; a sub-matrix selection device which selects one of the sub-matrices to use for substituting for the corresponding region determined by the replacement region determination device; a threshold value replacement device which creates a reformed threshold value matrix by replacing the threshold values of the corresponding region including the recording failure position in the basic threshold value matrix, with the one of the sub-matrices selected by the sub-matrix selection device; and a quantization processing device which quantizes the input image data by selectively using the basic threshold value matrix and the reformed threshold value matrix.

According to the image processing apparatus, it is possible to reproduce an image of high quality by using a small data storage volume, similarly to the beneficial effects of the above-described image processing method.

The recording failure position determination device may be a device in which information relating to recording failure positions is stored previously in a storage device such as a memory, and information is obtained by reading out the required information, or it may be a device which acquires information relating to recording failure positions, by actually printing a test pattern, or the like, and then reading in and analyzing the print results (recording failure position determination device).

In order to attain the aforementioned object, the present invention is also directed to a threshold value matrix creating method, comprising: a basic threshold value matrix storage step of storing a basic threshold value matrix set with threshold values used for halftoning of converting multiple-value input image data into dot data of a number of tonal graduations smaller than that of the multiple-value input image data by quantizing the multiple-value input image data; a sub-matrix storage step of storing a plurality of sub-matrices in association with recording failure positions in the basic threshold value matrix, each of the sub-matrices being set with threshold values which are substituted for the threshold values in a partial region of the basic threshold value matrix having a width of a prescribed number of pixels including a pixel position corresponding to a position of a malfunctioning recording element; a sub-matrix selection step of selecting at least one of the sub-matrices stored in the sub-matrix storage step; and a threshold value replacement step of creating a reformed threshold value matrix by replacing the threshold values of a partial region of the basic threshold value matrix with the sub-matrix selected in the sub-matrix selection step, the partial region including the recording failure position and having a width of a prescribed number of pixels.

If a plurality of recording failure positions are determined on the basic threshold value matrix, then replacement is made by using suitable sub-matrices, in the regions corresponding to the recording failure positions, respectively.

According to the present invention, replacement of the threshold values is performed by using the sub-matrices, suitably, according to the different recording failure positions in the basic threshold value matrix, and it is therefore possible to create a threshold value matrix which is suitable for correcting the image at respective recording failure positions. It is possible to provide a threshold value matrix creating device, by providing respective devices for carrying out the respective steps of the above-described threshold value matrix creating method.

In order to attain the aforementioned object, the present invention is also directed to an image forming apparatus, comprising: a recording head in which a plurality of recording elements are arranged; a conveyance device which causes the recording head and a recording medium to move relatively to each other by conveying at least one of the recording head and the recording medium; a recording failure position determination device which determines a recording failure position on an image corresponding to at least one of the recording elements that is malfunctioning in the recording head; a basic threshold value matrix storage device which stores a basic threshold value matrix set with threshold values used for halftoning of converting multiple-value input image data into dot data of a number of tonal graduations smaller than that of the multiple-value input image data by quantizing the multiple-value input image data; a sub-matrix storage device which stores a plurality of sub-matrices in association with recording failure positions in the basic threshold value matrix, each of the sub-matrices being set with threshold values which are substituted for the threshold values in a partial region of the basic threshold value matrix, the partial region including a pixel position corresponding to the recording failure position and having a width of a prescribed number of pixels; a replacement region determination device which determines a corresponding region with the width of the prescribed number of pixels including the recording failure position in the basic threshold value matrix, according to the pixel position in the input image data and the recording failure position determined by the recording failure position determination device; a sub-matrix selection device which selects one of the sub-matrices to use for substituting for the corresponding region determined by the replacement region determination device; a threshold value replacement device which creates a reformed threshold value matrix by replacing the threshold values of the corresponding region including the recording failure position in the basic threshold value matrix, with the one of the sub-matrices selected by the sub-matrix selection device; a quantization processing device which generates the dot data by quantizing the input image data by selectively using the basic threshold value matrix and the reformed threshold value matrix; and a recording control device which controls driving of the recording elements in the recording head, according to the dot data generated by the quantization processing device.

An inkjet recording apparatus according to one mode of the above-described image forming apparatus comprises: a liquid ejection head (recording head) having a liquid droplet ejection element row in which a plurality of liquid droplet ejection elements as the recording elements are arranged in a row, each liquid droplet ejection element comprising a nozzle for ejecting an ink droplet in order to form a dot and a pressure generating device (piezoelectric element, heating element, or the like) which generates an ejection pressure; and an ejection control device which controls the ejection of liquid droplets from the liquid ejection head according to the dot data generated by the quantization processing device. The image is formed on the recording medium by means of the liquid droplets ejected from the nozzles.

A compositional embodiment of recording head is a full line type recording head having a recording element row in which a plurality of recording elements are arranged through a length corresponding to the full width of the recording medium.

In this case, a mode may be adopted in which a plurality of relatively short recording head blocks having recording element rows which do not reach a length corresponding to the full width of the recording medium are combined and joined together, thereby forming recording element rows of a length that correspond to the full width of the recording medium.

A full line type recording head is usually disposed in a direction that is perpendicular to the relative feed direction (relative conveyance direction) of the recording medium, but a mode may also be adopted in which the recording head is disposed following an oblique direction that forms a prescribed angle with respect to the direction perpendicular to the conveyance direction.

"Recording medium" indicates a medium on which an image is recorded by means of the action of the recording head (this medium may also be called an ejection receiving medium, print medium, image forming medium, image receiving medium, or the like). This term includes various types of media, irrespective of material and size, such as continuous paper, cut paper, sealed paper, resin sheets, such as OHP sheets, film, cloth, a printed circuit board on which a wiring pattern, or the like, is formed by means of a liquid ejection head, and an intermediate transfer medium, and the like.

The conveyance device for causing the recording medium and the recording head to move relatively to each other may include a mode where the recording medium is conveyed with respect to a stationary (fixed) recording head, or a mode where a recording head is moved with respect to a stationary recording medium, or a mode where both the recording head and the recording medium are moved. When forming color images by means of an inkjet recording head, it is possible to provide type recording heads for each color of a plurality of colored inks (recording liquids), or it is possible to eject inks of a plurality of colors, from one recording head.

In order to attain the aforementioned object, the present invention is also directed to a sub-matrix creating method of creating the sub-matrix used in the above-described image processing method and apparatus, threshold value matrix creating method, and image forming apparatus, the sub-matrix creating method comprising: a sub-matrix region setting step of setting a partial region of the basic threshold value matrix including a recording failure position and having the width of the prescribed number of pixels, as a region to be replaced with the sub-matrix; an evaluation value calculation step of calculating an evaluation value of density distribution observed in a dot arrangement obtained by combining a dot arrangement corresponding to the sub-matrix and a dot arrangement corresponding to non-replaced regions of the basic threshold value matrix which are not replaced with the sub-matrix, in a process of settling the threshold values of the sub-matrix by successively determining the dot arrangement of positions in the sub-matrix other than the recording failure position; a dot arrangement settlement step of settling a dot arrangement to be added by using the evaluation values obtained in the evaluation value calculation step; and a threshold value input step of setting the threshold values corresponding to positions of added dots within the sub-matrix, according to the dot arrangement settled in the dot arrangement settlement step.

A desirable mode is one in which the evaluation value includes a value that evaluates at least one of the granularity and anisotropy. Desirably, the dot pattern evaluation index tales account of granularity and anisotropy. For example, the evaluation value is calculated by using an evaluation function including a linear combination of a granularity evaluation function and an anisotropy evaluation function. By taking account of both granularity and anisotropy, it is possible to achieve a more satisfactory evaluation.

Preferably, the sub-matrix creating method further comprises: an initialization step of setting the threshold value of each of positions in the sub-matrix having a size corresponding to the region to be replaced with the sub-matrix of the basic threshold value matrix set in the sub-matrix setting step, to an unsettled state; and a recording failure countermeasure threshold value setting step of setting a threshold value whereby no dot is generated regardless of the input value, with respect to the pixel position corresponding to the recording failure position on the initialized sub-matrix, wherein the threshold values are determined progressively by means of the evaluation value calculation step and the threshold value input step, for the positions in the sub-matrix other than the positions for which threshold values have been set in the recording failure countermeasure threshold value setting step.

In order to attain the aforementioned object, the present invention is also directed to a computer readable medium having embodied thereon a program for performing, by a computer, each of the above-described methods. The medium can be a propagated signal, which can be a carrier wave.

The program according to the present invention may be used as an operating program of a central processing unit (CPU) incorporated into a printer, and it may also be used in a computer system, such as a personal computer.

Furthermore, the program according to the present invention may be constituted by stand-alone applicational software, or it may be incorporated as a part of another application, such as image editing software. The program according to the present invention can be stored in a CD-ROM, a magnetic disk, or other information storage medium, and the program may be provided to a third party by means of such an information storage medium, or a download service for the program may be offered by means of a communications circuit, such as the Internet.

According to the present invention, since a threshold value matrix for achieving a dot arrangement suitable for image formation in the vicinity of a recording failure position is created by replacing the threshold values of a partial region corresponding to a recording failure position on a basic threshold value matrix (a range having a width of a prescribed number of pixels), with a sub-matrix, then even if there is a recording element producing a recording failure, it is possible to obtain an image of high quality in which image defects caused by the recording failure are not conspicuous.

Furthermore, since the present invention can be applied to a basic threshold value matrix having a large matrix size (for example, a basic threshold value matrix having blue noise characteristics), then it is also possible to form an image of image quality from the viewpoint of the matrix size, as well. Moreover, since the threshold value matrix corresponding to recording failure can be composed by replacing a partial region of the basic threshold value matrix with a sub-matrix, then it is possible to reduce the storage volume of the matrix data including countermeasures for recording failures (the sum of the basic threshold value matrix data and the sub-matrix data).

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a conceptual diagram showing an example of the relationship between the ejection failure position, a replaced region, and non-replaced regions;

FIG. 4 is a conceptual diagram showing an example of the relationship between a replaced region MA(X) and non-replaced regions MB(X) in the basic threshold value matrix M;

FIG. 5 is a conceptual diagram showing an example of the dot arrangement DMA(X, L) of the replaced region MA(X), and the dot arrangement DMB(X, L) of the non-replaced regions MB(X);

FIG. 6 is a conceptual diagram showing an embodiment of the dot arrangement DSM(X, L) of an ejection failure countermeasure sub-matrix SM(X), and the dot arrangement DMB(X, L) of the non-replaced regions MB(X);

FIG. 8 is a flowchart showing the procedure for settling the ejection failure countermeasure sub-matrix;

FIG. 9 is a flowchart showing the procedure for settling the ejection failure countermeasure sub-matrix;

FIG. 22A is a plan view perspective diagram showing an embodiment of the composition of an inkjet recording head, FIG. 22B is a principal enlarged view of FIG. 22A, and FIG. 22C is a plan view perspective diagram showing a further embodiment of the structure of a full line head;

FIGS. 26A and 26B are schematic diagrams showing an example in which an image is formed using a scanning print head;

DETAILED DESCRIPTION OF THE PREFERRED EMBODIMENTS

General Description of Image Processing Method in an Embodiment of the Present Invention In the image processing method according to an embodiment of the present invention, threshold values are calculated for regions of a prescribed width corresponding to ejection failure positions beforehand, these threshold values are stored as ejection failure countermeasure sub-matrices, and the ejection failure countermeasure sub-matrix is substituted for a portion of a basic threshold value matrix in accordance with the ejection failure position.

Figure 1:
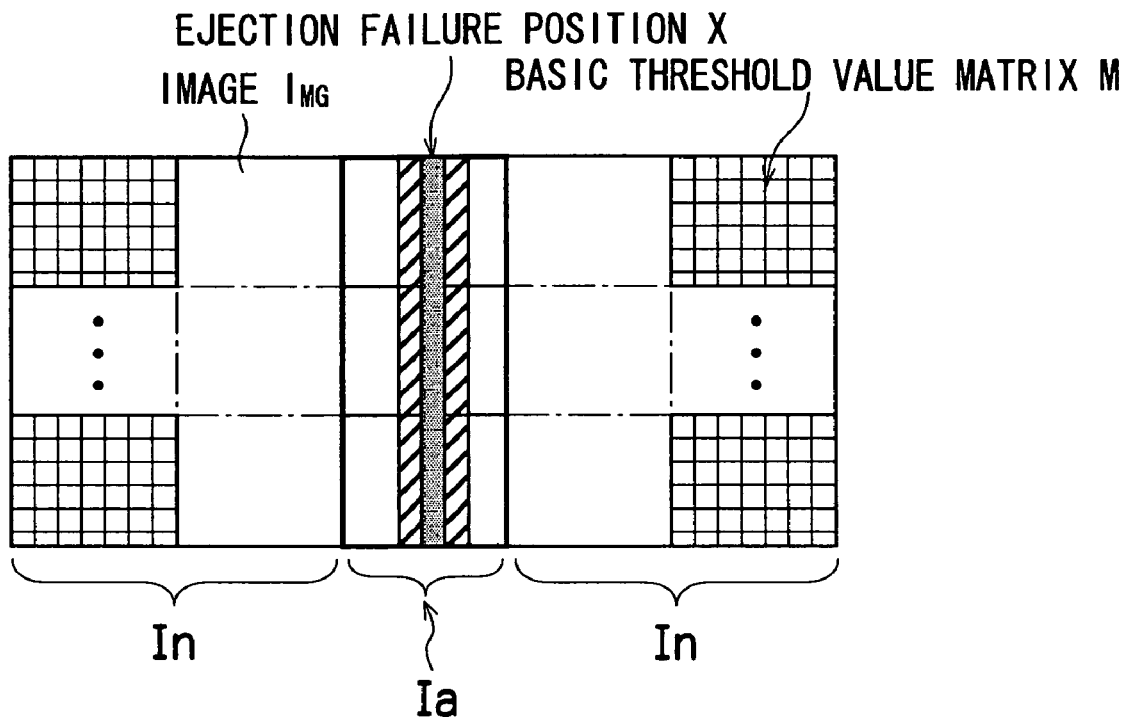
FIG. 1 is a conceptual diagram of image processing using a basic threshold value matrix and an ejection failure countermeasure sub-matrix.

FIG. 1 is a diagram showing the concept of image processing according to the embodiment of the present invention. As shown in FIG. 1, by repeatedly applying the basic threshold value matrix M with respect to the input image $I_{MG}$ to cover the input image as with tiles, the image is quantized and converted into a pseudo graduated tonal image (dot data). Here, it is supposed that a particular nozzle of the print head (in this case, a line head is used) is suffering an ejection failure or malfunctioning, and a streak-shaped artifact (blanking out) occurs in an image position (ejection failure position) corresponding to this malfunctioning nozzle, as shown in FIG. 1. When recording paper (recording medium) is conveyed in the vertical direction in FIG. 1, a streak-shaped defect occurs in the paper conveyance direction (sub-scanning direction).

The normal image region $I_n$ of the input image $I_{MG}$ where there is no ejection failure is quantized by being directly applied with the basic threshold value matrix M. On the other hand, if the ejection failure position X is contained in the image region where the basic threshold value matrix M is to be applied (as in the image region $I_a$ in FIG. 1), another matrix is used in which a portion of the basic threshold value matrix M (a column region having a width of a prescribed number of pixels including the position corresponding to the ejection failure position X; namely, the shaded region in FIG. 1) is replaced with the ejection failure countermeasure sub-matrix.

Figure 2:
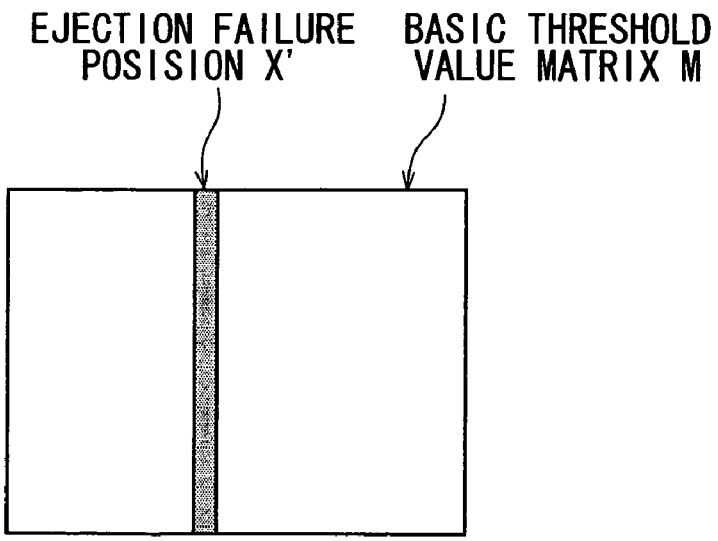
FIG. 2 is a conceptual diagram of an example of the relationship between the basic threshold value matrix and an ejection failure position.

In other words, as shown in FIG. 2, taking X' to be the ejection failure position on the basic threshold value matrix M corresponding to the ejection failure position X in the image, then as shown in FIG. 3, the region (replaced region) MA having a width of a prescribed number of pixels including the ejection failure position X' corresponding to the ejection failure position X is replaced in the basic threshold value matrix M with the ejection failure countermeasure sub-matrix SM(X') that achieves a dot arrangement in which streaking due to the ejection failure is not conspicuous. Threshold values are inputted in the ejection failure countermeasure sub-matrix SM(X') in such a manner that the nozzle corresponding to the ejection failure position X' is not used. In the basic threshold value matrix M in FIG. 3, non-replaced regions MB are not replaced with the ejection failure countermeasure sub-matrix SM(X').

Before embarking on a detailed description, the principal characteristics of the image processing method according to the present embodiment are enumerated. The image processing method of the present embodiment is used in cases where an ejection failure in a print head produces a streak-shaped artifact. Here, the concept of "ejection failure" is not limited to an ejection failure caused by a nozzle blockage, and it may also include cases where a malfunctioning nozzle producing defective ejection for some reason, such as deviation in the landing position of the ejected droplet or error in the volume of the ejected droplet, is disabled (where use of the nozzle is halted compulsorily).

When image processing is to be carried out, firstly, information on ejection failure positions is required. The ejection failure positions in an image are determined by means of a device which determines ejection failure positions by printing a prescribed test pattern and reading in the result of the test print beforehand, or a method which reads out information from a storage device which has stored the ejection failure positions beforehand.

The ejection failure countermeasure sub-matrix has a prescribed width with respect to the ejection failure position (desirably, a width of 3 pixels to 7 pixels). Here, the "3 pixels" means a range which includes the pixel of the ejection failure position and the adjacent pixels on either side, and since this uses only the pixel positions on either side of the ejection failure position, it is the smallest size. The "5 pixels" means a range which also includes the two adjacent pixels to the outer sides of the 3 pixels described above, and it is a desirable size since the adjacent positions on either side of the ejection failure position are used for correcting the ejection failure position, and the positions further to the outside are used for correction to reduce variations in the two adjacent positions. The "7 pixels" means a range which also includes the two adjacent pixels to the outer sides of the 5 pixels described above, and it is a desirable size since the adjacent positions on either side of the ejection failure position are used for correcting the ejection failure position, the two positions further to the outside are used for correction to reduce variations in the two adjacent positions, and the two positions yet further to the outside are also used for correction to reduce variations. The best mode of the size (prescribed width) of the ejection failure countermeasure sub-matrix is related to the image resolution. For example, at the image resolution of 1200 dpi, a size of 3 pixels to 5 pixels is desirable, and at the image resolution of 2400 dpi, a size of 3 pixels to 9 pixels is desirable.

The ejection failure countermeasure sub-matrix is settled in such a manner that when it is substituted for the corresponding region on the basic threshold value matrix, no artifact occurs in the adjacent regions on the basic threshold value matrix (namely, the areas of the boundaries between the replaced region and the regions that are not replaced (non-replaced regions)).

The ejection failure countermeasure sub-matrix is also settled in such a manner that, when it is substituted for the corresponding region on the basic threshold value matrix, the granularity of the image does not change greatly in the adjacent regions on the basic threshold value matrix.

The ejection failure countermeasure sub-matrix is also settled in such a manner that, when it is substituted for the corresponding region on the basic threshold value matrix, the density is generally uniform in the adjacent regions on the basic threshold value matrix.

The ejection failure countermeasure sub-matrix is also settled so as to achieve a dot arrangement which reduces the visual impression of the ejection failure.

The ejection failure countermeasure sub-matrix is also settled in such a manner that, when it is substituted for the corresponding region on the basic threshold value matrix, then conditions relating to a plurality of evaluation values (reduction of the visual impression of the ejection failure, approximately uniform density, absence of artifacts, no significant change in granularity) are satisfied in the adjacent regions on the basic threshold value matrix.

Even if N pieces of different ejection failure countermeasure sub-matrices are prepared in order to handle all of the ejection failure positions in the basic threshold value matrix, then at the most, the data size will be 3×N×N to 9×N×N, and therefore, an extremely small data volume is achieved in comparison with the related art where the data is of the order of $N^3$ (where N=64, 128, or 256).

If ejection failures have occurred in a plurality of positions within the basic threshold value matrix, then a plurality of ejection failure countermeasure sub-matrices are substituted correspondingly for the respective ejection failure positions. In this case, if the ejection failures are located within the width of the prescribed number of pixels (for example, if the prescribed width is 7 pixels and there are less than 6 pixels between two ejection failure positions), then a problem occurs in that the respective ejection failure countermeasure sub-matrices will overlap with each other.

In a situation of this kind, it is possible to resolve the problem by using a smaller prescribed width for at least one of the ejection failure countermeasure sub-matrices, in order that the ejection failure countermeasure sub-matrices do not overlap with each other. For example, if the prescribed width is 5 pixels, then either of the ejection failure countermeasure sub-matrices is changed to 3 pixels or 5 pixels. Desirably, the ejection failure countermeasure sub-matrices having a minimum prescribed width are also provided in order to be able to deal with cases where the ejection failure positions are close together.

Naturally, it is also possible to adopt a method in which the ejection failure countermeasure sub-matrices are beforehand settled for a case where there are two ejection failures within the prescribed width. In this case, the data volume of the ejection failure countermeasure sub-matrices (the storage capacity required to store the ejection failure countermeasure sub-matrices) becomes larger in accordance with the combinations of the plurality of ejection failure positions. However, considering a case where the prescribed width is 7 pixels, for example, and the two ejection failure positions are located within 6 pixels to 3 pixels of each other (if the ejection failure positions are too close to each other, then the actual correction performance declines, and therefore, a minimum limit is required if uniform correction performance is expected, and for example, it is impossible to perform correction if the two pixel positions are adjacent to each other), then the resulting data volume will be at most 4×14×N×N (=4 (the number of combinations in which positions can be selected in a range of 6 pixels to 4 pixels)×14 (prescribed width: 7 pixels+7 pixels)×N (the number of rows)×N (the number of columns)). Consequently, there is no dramatic increase in the storage volume, such as the data volume of the order of $N^3$ attained in the related art.

The ejection failure countermeasure sub-matrix has a greater corrective effect in terms of reducing artifacts, the greater the prescribed width. However, once it exceeds a certain size, the correction performance becomes saturated. Desirably, a suitable prescribed width (for example, 5 pixels) is selected which achieves a balance between the corrective effects, the proximity of the ejection failure positions, and the storage volume.

Method of Calculating Ejection Failure Countermeasure Sub-Matrix

Next, a method of calculating (settling) the ejection failure countermeasure sub-matrix is described.

It is the basic calculation principle to settle an ejection failure countermeasure sub-matrix SM(X) on the basis of the basic threshold value matrix M. Here, the ejection failure position is indicated by the variable "X".

Firstly, the main concepts relating to the calculation are described with reference to FIGS. 4 to 6. FIG. 4 is a conceptual diagram showing an example of the relationship between a replaced region MA(X) and non-replaced regions MB(X) in the basic threshold value matrix M. FIG. 5 is a conceptual diagram showing an example of the dot arrangement DMA (X, L) of the replaced region MA(X) and the dot arrangement DMB(X, L) of the non-replaced regions MB(X) in the basic threshold value matrix M. DMA(X, L) and DMB(X, L) are the dot arrangements where the dots are set to "ON" at the ejection failure position X and if the threshold value is equal to or lower than L.

Furthermore, FIG. 6 shows a situation where the ejection failure countermeasure sub-matrix SM(X) has been substituted for the replaced region MA(X) in the basic threshold value matrix M, and it shows an example of the dot arrangement DSM(X, L) of the ejection failure countermeasure sub-matrix SM(X) and the dot arrangement DMB(X, L) of the non-replaced regions MB(X) of the basic threshold value matrix M.

The meanings of the main characters and symbols used in calculating the ejection failure countermeasure sub-matrix according to the present embodiment, as shown in FIGS. 4 to 6, are as indicated below:

LM={L0, L1, L2, L3, . . . } is the threshold value set included in the basic threshold value matrix M;

DMA(X, L) is the dot arrangement in the region to be replaced (replaced region) MA(X) on the basic threshold value matrix M;

LA={L0, L2, L3, L5, . . . } is the threshold value set included in the replaced region MA;

DMB(X, L) is the dot arrangement of the regions not to be replaced (non-replaced regions) MB(X) on the basic threshold value matrix M;

LB={L1, L4, L7, . . . } is the threshold value set included in the non-replaced regions MB; and DSM(X, L) is the dot arrangement on the ejection failure countermeasure sub-matrix SM(X), where L is the input value (input values for whole matrix) or tonal graduation value, and the dot arrangement is settled in accordance with this input value L.

Hence, the threshold value set LM included in the basic threshold value matrix M is the combined set of the threshold value set LA included in the replaced region MA(X) and the threshold value set LB included in the non-replaced region MB(X) (i.e., LM=LA+LB, and since this is a set calculation, then LM=LA∪LB).

The restricting conditions on this calculation are as described below.

(1) The dot arrangement DMA(X, L) and the dot arrangement DSM(X, L) have similar numbers of dots and similar dot size compositions (restricting condition 1-1), and have substantially the same density (the restricting condition 1-2).

(2) When the dot arrangement DSM(X, L) and the dot arrangement DMB(X, L) are combined together, no artifacts are generated, and no steps in density and no edges are perceptible (the restricting condition 2-1). The dot arrangement DSM(X, L) and the dot arrangement DMB(X, L) have the granularities not widely separated from each other (the restricting condition 2-2).

(3) In the dot arrangement DSM(X, L), no artifacts (streaking) due to the ejection failure are perceptible (the restricting condition 3-1).

The threshold values of the ejection failure countermeasure sub-matrix are progressively built up by sequentially specifying dot arrangements (dot distributions) in such a manner that the aforementioned restricting conditions are satisfied, while gradually increasing the input value L, thereby completing the ejection failure countermeasure sub-matrix.

Figure 7:
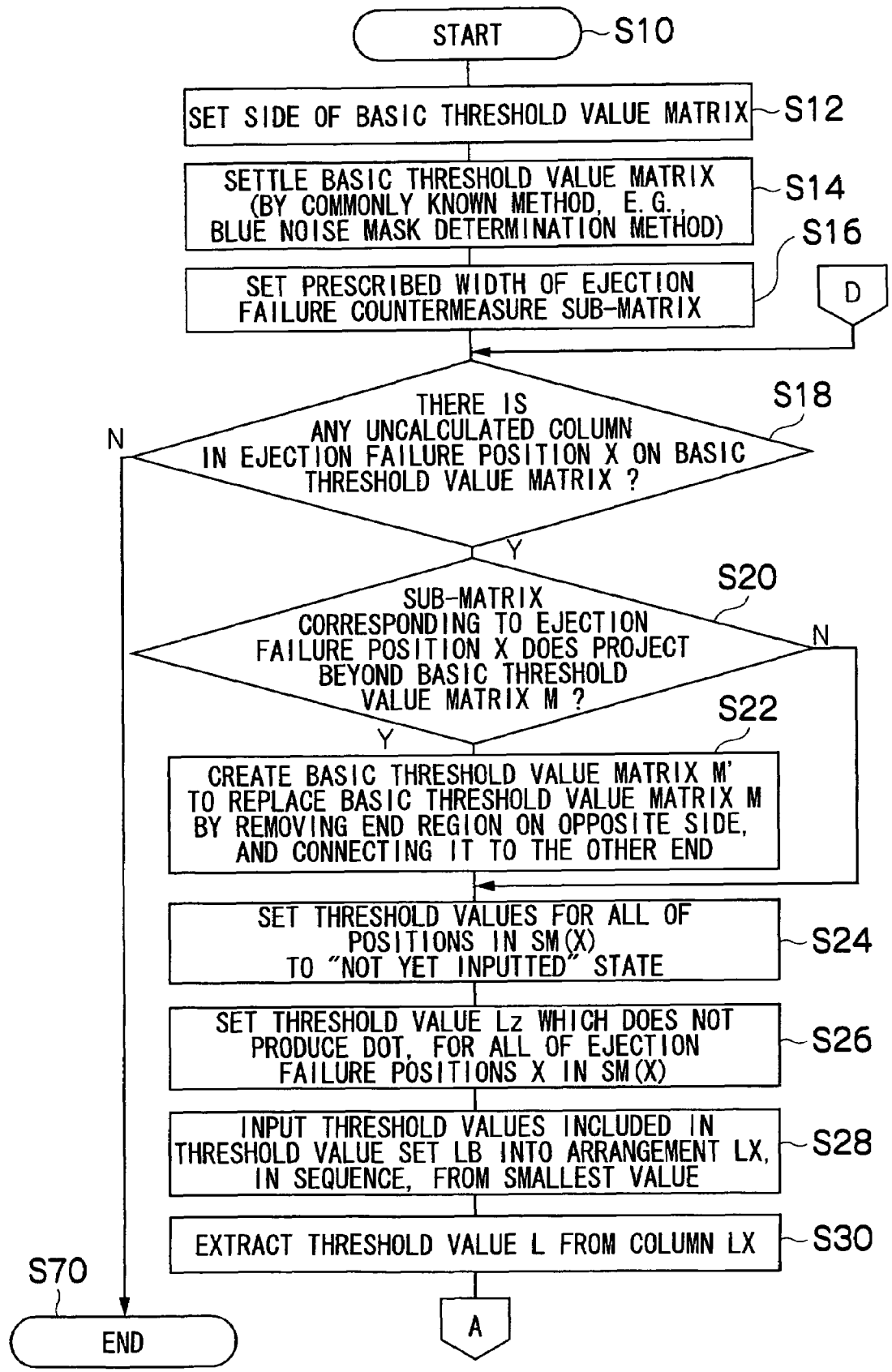
FIG. 7 is a flowchart showing a procedure for settling an ejection failure countermeasure sub-matrix.

FIGS. 7 to 9 are flowcharts which show a procedure for settling an ejection failure countermeasure sub-matrix. In the following description, reference to "threshold value not yet inputted" has a straightforward meaning in the case of binary values (where a dot can only be ON or OFF) since it can be judged whether or not a threshold value has been inputted at that position. Whereas in the case of multiple values (variable dot size), the threshold values corresponding to respective tonal graduation values (dot sizes) are located in the same position, and therefore, the reference to "threshold value not yet inputted" indicates a state where at least one of the threshold values of the tonal graduation values (dot sizes) has not yet been inputted at the same position. For example, if the dot size can be varied between three sizes, large, medium and small, then looking specifically at any one pixel, there is, firstly, a threshold value for forming a dot of the small size from a state of no dot (first level threshold value), and also, a threshold value for changing from the small size dot to a medium size dot (second level threshold value), and a threshold value for changing from the medium size dot to a large size dot (third level threshold value), these threshold values being set in a step-like fashion. Consequently, if at least one of the threshold values of the respective levels has not yet been inputted, then the expression "threshold value not yet inputted" is used.

When the processing of the present algorithm shown in FIG. 7 is started (step S10), firstly, the size of the basic threshold value matrix is set (for example, 256 (rows)×256 (columns) of pixels, or 512 (rows)×512 (columns) of pixels, or the like) (step S12), and a basic threshold value matrix of the set size is settled (step S14). A commonly known method can be used for settling the basic threshold value matrix. For example, a method for settling a blue noise mask, or the like, is used.

Next, the prescribed width of the ejection failure countermeasure sub-matrix is set (step S16). This prescribed width is set to 7 pixels, for example. In the algorithm, a prescribed width value is inputted externally by an operator.

Next, the procedure advances to a first loop judgment step S18. The first loop is a calculation loop in which the ejection failure position X is changed progressively within the basic threshold value matrix. In step S18, it is judged whether or not there is a column corresponding to the ejection failure position X in the basic threshold value matrix for which calculation has not yet been performed (see FIGS. 2, 3 and 10 with respect to the relationship between the basic threshold value matrix and the ejection failure position X). If there is no column in the basic threshold value matrix that has not yet been calculated, then the procedure leaves the first loop and the current algorithm terminates (step S70 in FIG. 7).

If there is an uncalculated column at step S118, then the procedure advances to step S20, where it is judged whether or not the ejection failure countermeasure sub-matrix SM(X) corresponding to the ejection failure position X projects beyond the basic threshold value matrix M. This processing corresponds to a case where the ejection failure position X is located at an end region of the basic threshold value matrix M, as shown in the left-hand side in FIG. 10. In other words, if the ejection failure position X' on the basic threshold value matrix M corresponding to the ejection failure position X is situated in an end region of the basic threshold value matrix M, then a situation may arise in which the ejection failure countermeasure sub-matrix projects beyond the range of the basic threshold value matrix M, if the prescribed width of the ejection failure countermeasure sub-matrix is respected. In a case of this kind, the end region ME on the opposite side of the basic threshold value matrix M is moved to the end adjacent to the ejection failure position X', thus converting the basic threshold value matrix M into a matrix M' shown in the right-hand side in FIG. 10. Thereafter, this matrix M' is treated as the basic threshold value matrix (step S22 in FIG. 7). After step S22, the procedure advances to step S24.

If the ejection failure countermeasure sub-matrix SM(X) does not project beyond the basic threshold value matrix M at step S20, then the procedure skips the processing in step S22 and advances to step S24.

At step S24, the threshold values for all of the positions in the ejection failure countermeasure sub-matrix SM(X) are set to a "not yet inputted" state (initialized). Then, a threshold value Lz at which no dot is represented (a prescribed value whereby no dot is switched on, regardless of the input value L), is set for all of the ejection failure positions X of the ejection failure countermeasure sub-matrix SM(X) (all of the positions in the column corresponding to the ejection failure position X) (step S26).

Thereupon, the threshold values included in the threshold value set LB of the non-replaced region MB(X) and arranged in ascending order (i.e., the order starting from the smallest value) are inputted to the arrangement LX (step S28). The threshold values L are then extracted in ascending order from this arrangement LX (step S30).

After step S30, the procedure advances to step S32 in FIG. 8. Step S32 involves processing for judging the conditions for leaving a second loop. The second loop is a loop which repeats calculation starting from the initial value of the threshold value L until the final value thereof, and the procedure leaves the second loop and advances to S66, either when all of the threshold values have been calculated (when the arrangement LX becomes empty), or when the termination conditions have been satisfied. At step S32, it is judged whether or not the arrangement LX is empty ($\phi$), and if the result is NO, then the procedure advances to step S34, where it is confirmed whether or not there is a position for which the threshold value has not yet been inputted. If, at step S34, there is no position for which the threshold value has not yet been inputted, then the termination conditions are satisfied, and hence the procedure leaves the second loop and advances to step S66.

If the result is NO at step S32 and it is judged at step S34 that there is a position for which a threshold value has not yet inputted, then the procedure advances to step S36 and starts the calculation of the second loop. At step S36, a dot arrangement DMB(X, L) corresponding to the current threshold value L is settled. Furthermore, a dot arrangement DMA(X, L) corresponding to the threshold value L is also settled (step S38).

Here, it is judged whether or not there exists a dot corresponding to the ejection failure position in the dot arrangement DMA(X, L) of the replaced region (step S40). If there is no dot corresponding to the ejection failure position in DMA (X, L), the procedure advances to step S42, and the threshold value L is inputted to the positions in SM(X) corresponding to the positions of the threshold value L in MA(X). This means that, as long as the malfunctioning nozzle is not to be used (under conditions where the nozzle in question is not originally to be used), the arrangement (threshold values) of MA(X) are used directly, without modification, in the ejection failure countermeasure sub-matrix SM(X) (since the restricting conditions are automatically satisfied). After step S42, the next threshold value L is extracted from the arrangement LX (step S44), and the procedure then returns to step S32.

On the other hand, if the dot corresponding to the ejection failure position is present in DMA(X, L) at step S40, in other words, under conditions where the malfunctioning nozzle is to be used, then the procedure moves to step S50 in FIG. 9, where processing is started for settling the position of the threshold value L that achieves a dot arrangement in which the ejection failure position is not be used. When the malfunctioning nozzle starts to be used at a particular stage, then a YES result is always returned at step S40 for the subsequent threshold values L, and the procedure advances to the calculation in FIG. 9.

More specifically, firstly, a dot arrangement DSM(X, L−1) of the ejection failure countermeasure sub-matrix SM(X) corresponding to the previous threshold value L−1 is settled (step S50). In the procedure to settle the ejection failure countermeasure sub-matrices successively starting from a low threshold value, the threshold values have been set up to a certain stage (below a stage where the ejection failure position is used), and when the procedure comes to a threshold value at which the ejection failure position starts to be used, then an additional dot arrangement is appropriately settled. In this case, a suitable location for the placement of the next additional dot is determined from the state of the dot arrangement of the previous threshold value L−1, on the basis of the restricting conditions.

Although a dot arrangement DSM(X, L−1) corresponding to the threshold value L−1 is settled here, another threshold value may be used, provided that it is smaller than L and is equal to or larger than the largest threshold value smaller than L in the arrangement LX (L−1 satisfies these conditions).

Next, using a prescribed dot model, a density distribution DDM is calculated in respect of a dot arrangement DM in which DSM(X, L−1) and DMB(X, L) are combined (step S52). In other words, the density distribution DDM is determined using a prescribed dot model, with respect to the dot arrangement DM that is composed of the dot arrangement DMB(X, L) of the outer regions (the non-replaced regions MB(X)), which are not replaced, and the dot arrangement DSM(X, L−1) of the replaced region (in the state where the number of dots is one fewer).

Moreover, a density histogram HDDM is created on the basis of the DDM thus derived, after processing by a spatial filter based on the visual characteristics (step S54).

Next, on the basis of the DDM obtained after processing by the spatial filter based on the visual characteristics, candidate positions are extracted by determining positions which are within the region of DSM, for which a threshold value is not yet inputted, and which satisfy the condition of being within a prescribed number of pixels from the minimum density in the density histogram HDDM (step S56). This processing serves to narrow down the candidates for additional dot positions, when settling where the next dot is added in the ejection failure countermeasure sub-matrix. The candidate positions are selected on the basis of the conditions that there is a high possibility of introducing the next dot in the vicinity of the low density region of the density distribution DDM (where density non-uniformity would be reduced by the addition of the dot), and that the candidate positions are positions for which a threshold value has not yet been inputted, and are situated in the ejection failure countermeasure sub-matrix that is to be substituted. Since the threshold value Lz has been inputted for the column of the ejection failure position X (step S26 in FIG. 7), then the positions in this column are not included in the candidate positions.

Subsequently, a dot arrangement DM'(i) is settled in which an applicable tonal graduation value (dot size) is added to the candidate position extracted at step S56, and the density distribution DDM'(i) of this dot arrangement DM'(i) is determined by using a prescribed dot model (step S58).

Furthermore, the DDM'(i) is evaluated for granularity and anisotropy (artifacts) on the basis of the visual characteristics, and the corresponding evaluation value EDDM'(i) is obtained (step S60).

As one embodiment of the method of calculating the evaluation value EDDM'(i), the evaluation value EDDM'(i) is taken to be a linear combination of a graininess evaluation function and an anisotropy evaluation function, and is defined by the following equation (Eq. A):

$$EDDM'(i) = wg \times \text{Graininess evaluation function } (i) + wa \times \text{Anisotropy evaluation function } (i),\quad \text{(Eq. A)}$$

where wg and wa are weighting factors.

The anisotropy and the average index (Radially Averaged Power Spectrum; R.A.P.S.) of a radial-coordinate power spectrum in the dot luminosity distribution proposed by Robert Ulichney can be used as the graininess evaluation function and the anisotropy evaluation function.

A dot placement is obtained as a result of digital halftoning, and a method proposed by Robert Ulichney ("Digital Halftoning"; published by The MIT Press) is typically used as a method of evaluating the dot placement (dot arrangement).

Figure 11:
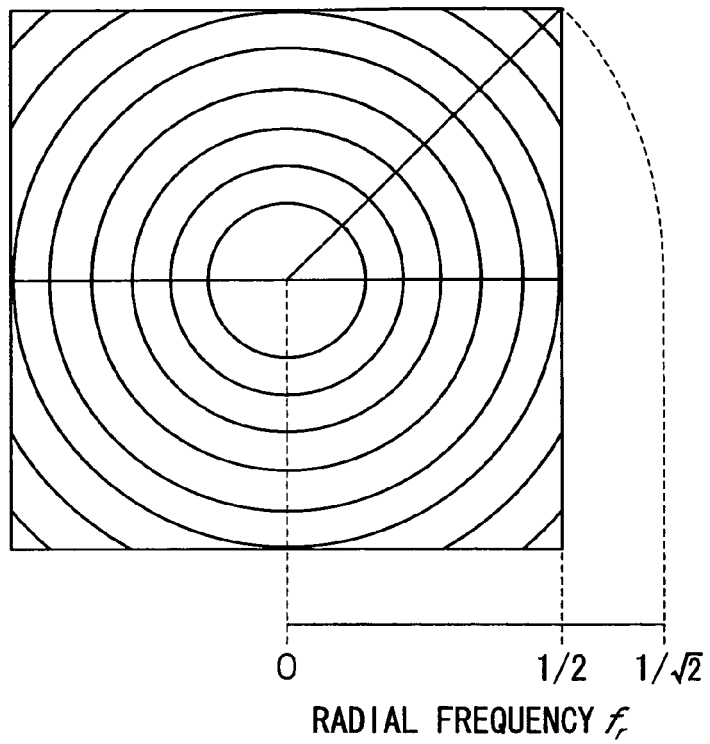
FIG. 11 is a diagram showing a radial coordinate system for indicating the average index of a radial-coordinate power spectrum (R.A.P.S.: Radially Averaged Power Spectrum)

More specifically, the two-dimensional power spectrum of the dot placement is converted to radial coordinates, as in FIG. 11, and the index corresponding to the average and dispersion of the spectrum at all angles is calculated for the spatial frequency fr corresponding to the radius of the radial coordinates.

The average index of the polar-coordinate power spectrum is referred to as "radially averaged power spectrum (R.A.P.S.)" and is expressed by the following equation:

$$P_r(f_r) = \frac{1}{N_r(f_r)} \sum_{i=1}^{N_r(f_r)} \hat{P}(f).$$

The dispersion index is referred to as "anisotropy" and is expressed by the following equation:

$$s^2(f_r) = \frac{1}{N_r(f_r) - 1} \sum_{i=1}^{N_r(f_r)} \left(\hat{P}(f) - P_r(f_r)\right)^2$$

$$\text{anisotropy} = \frac{s^2(f_r)}{P_r^2(f_r)}.$$

The radially averaged power spectrum (R.A.P.S.) is a spectrum related to the visibility of the dot placement, and the anisotropy is the index pertaining to the anisotropy of the dot arrangement.

Figure 12:
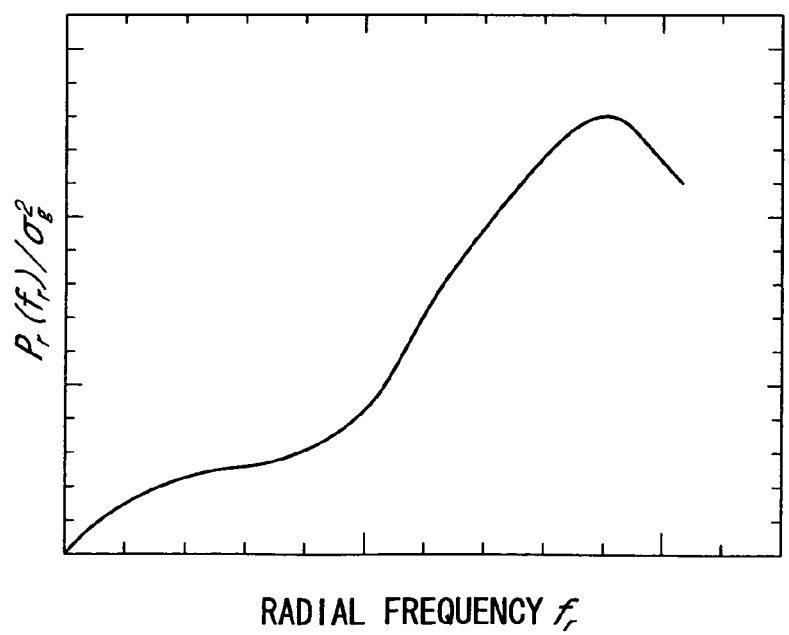
FIG. 12 is a graph showing an example of the R.A.P.S. calculated under certain conditions.

An example of R.A.P.S. calculated under certain preferable conditions is shown in FIG. 12. In FIG. 12, $\sigma_g$ is expressed by the following equation:

$$\sigma_g = g(1-g),$$

where g is the normalized inputted value, and $0 \leq g \leq 1$.

Figure 13:
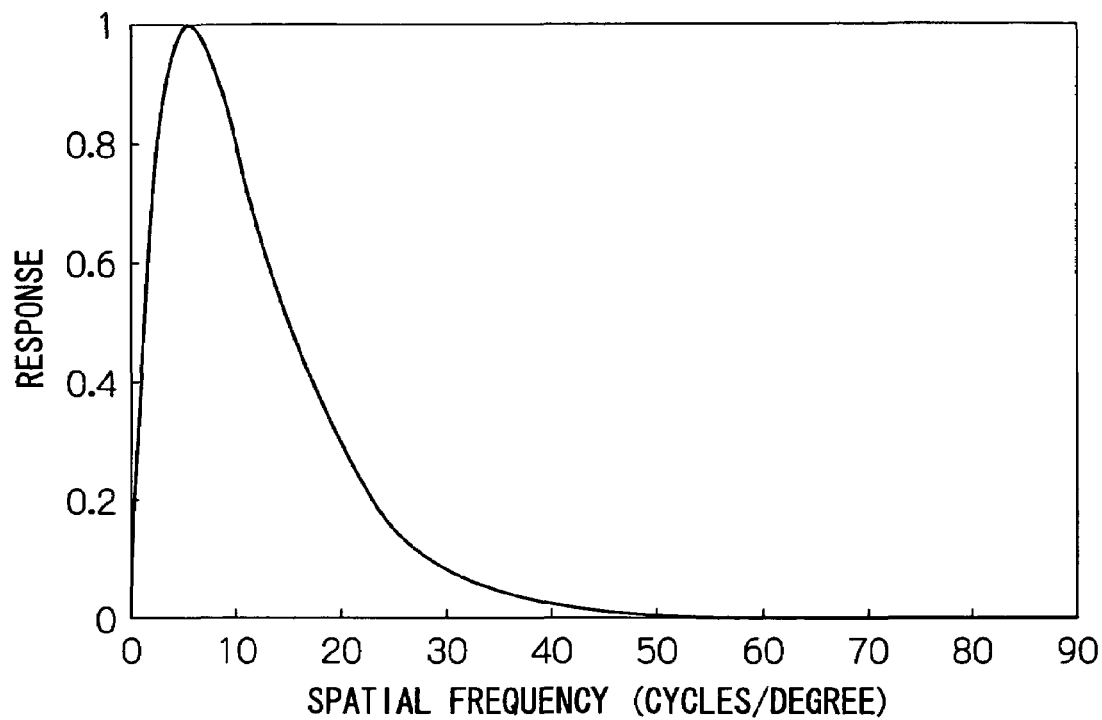
FIG. 13 is a graph showing an example of human visual characteristics (VTF: Visual Transfer Function)

In the graph shown in FIG. 12, the visibility characteristics are not taken into account. However, by taking into account (multiplying) the well-known visibility characteristics (visual transfer function (VTF)) shown in FIG. 13, the overall energy is suppressed to a low level. Note that the VTF used when calculating the R.A.P.S. and anisotropy is not limited to that proposed by Dooly and Shaw, and another well-known VTF may be used.

Figure 14:
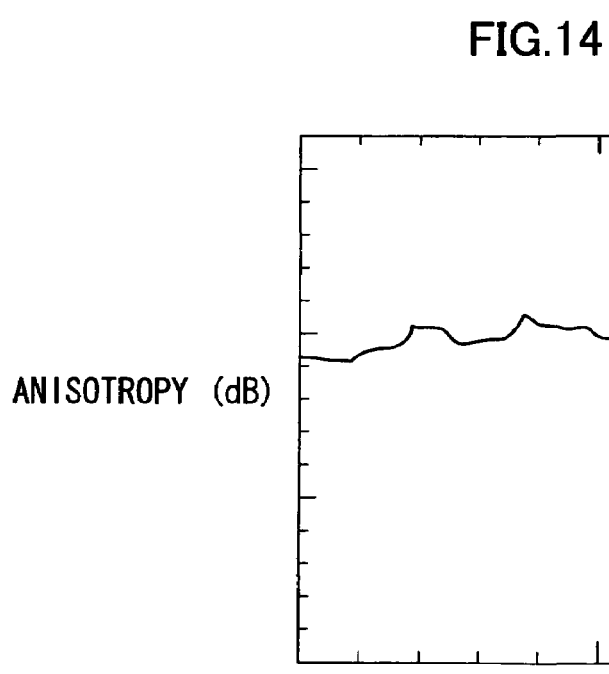
FIG. 14 is a graph showing an example of the anisotropy of the radial coordinate power spectrum calculated under certain conditions.

FIG. 14 shows an example of the anisotropy calculated under certain preferred conditions. According to Robert Ulichney, the dot anisotropy ceases to be noticeable when the anisotropy is −10 decibels (dB) or less.

In the present embodiment, the evaluation value EDDM'(i) is defined by the above Eq. (A), wherein the R.A.P.S. is used for the graininess evaluation function (i), and the anisotropy is used for the anisotropy evaluation function (i).

This evaluation is carried out while successively changing the positions (i), with respect to the candidate positions i extracted at step S56 in FIG. 9 (steps S58 to S60). The position having the most favorable evaluation value is thereby selected, and the threshold value L is then inputted to that position (step S62).

When the input position of the threshold value L has been determined in this way, the next threshold value L is extracted from the arrangement LX (step S64), and the procedure then returns to step S32 in FIG. 8.

The above-described processing is repeated while successively changing the threshold value L, and then the threshold values are successively inputted to the positions on the ejection failure countermeasure sub-matrix SM(X). When there are no longer any positions for which a threshold value has not yet been inputted, the procedure leaves the second loop and the ejection failure countermeasure sub-matrix SM(X) corresponding to the ejection failure position X is settled (step S66). Next, the ejection failure position X is changed to the next position (step S68), and the procedure returns to step S18 in FIG. 7 (the start of the first loop). When the ejection failure countermeasure sub-matrices SM(X) corresponding to all of the ejection failure positions X have been settled, a NO verdict is returned at step S18, and the procedure leaves the first loop, whereupon the present sequence terminates (step S70).

Figure 15:
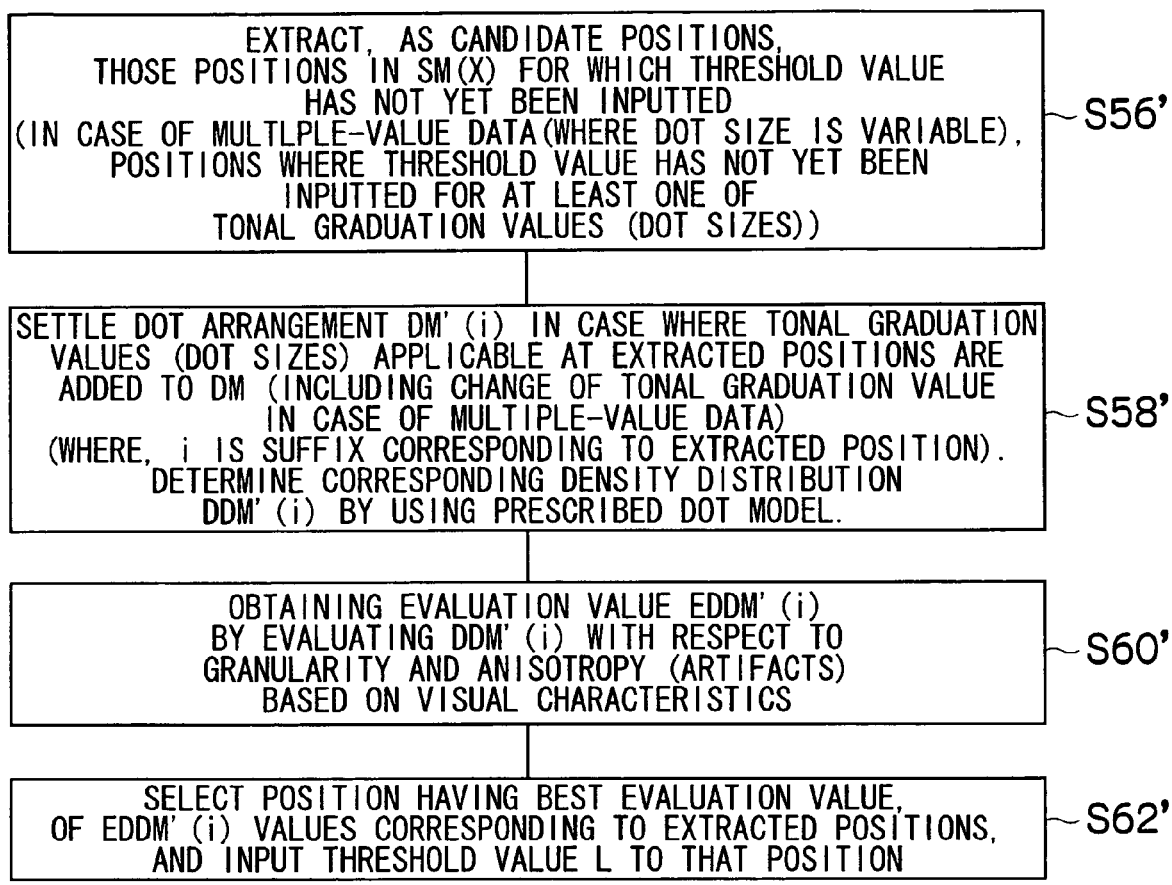
FIG. 15 is a principal flowchart showing a further embodiment of processing which can be substituted for a portion of the flowchart shown in FIG. 9.

The processing in steps S56 to S62 described in FIG. 9 may be replaced with the processing in steps S56' to S62' shown in FIG. 15.

In steps S56 to S62 in FIG. 9, the candidate positions are narrowed down to the range of a certain number of pixels from the lowest density value in the density histogram HDDM, and the optimum position is then selected from this reduced group of candidate positions, but in the embodiment of processing in steps S56' to S62' shown in FIG. 15, the candidate positions are not narrowed down in this way, and a calculation is made for all of the positions at which there is a possibility of inserting the next additional dot. The details of the processing in steps S56' to S62' are as described in FIG. 15. In order to reduce the amount of calculations, a desirable mode is one in which the candidates are narrowed down as shown in FIG. 9. However, in order to determine the optimum position accurately, it is desirable to perform the calculations for all of the potential positions, as shown in FIG. 15.

According to the method as described with reference to FIGS. 7 to 15, the basic threshold value matrix M and the plurality of ejection failure countermeasure sub-matrices SM(X) corresponding to the ejection failure positions are obtained.

Here, the concept of "blue noise characteristics" is described briefly. When a dot arrangement is evaluated using the evaluation method described with reference to FIGS. 11 to 14, the dot arrangement is said to have "blue noise characteristics" when it has characteristics where the R.A.P.S. is low in the low-frequency region, has a peak at the medium-frequency region, and is uniform in the high-frequency region, and the anisotropy is −10 decibels (dB) or less. When the dot arrangement settled by means of the threshold value matrix has the blue noise characteristic, the threshold value matrix is referred to as a "blue noise mask". The graph shown in FIG.

Figure 16:
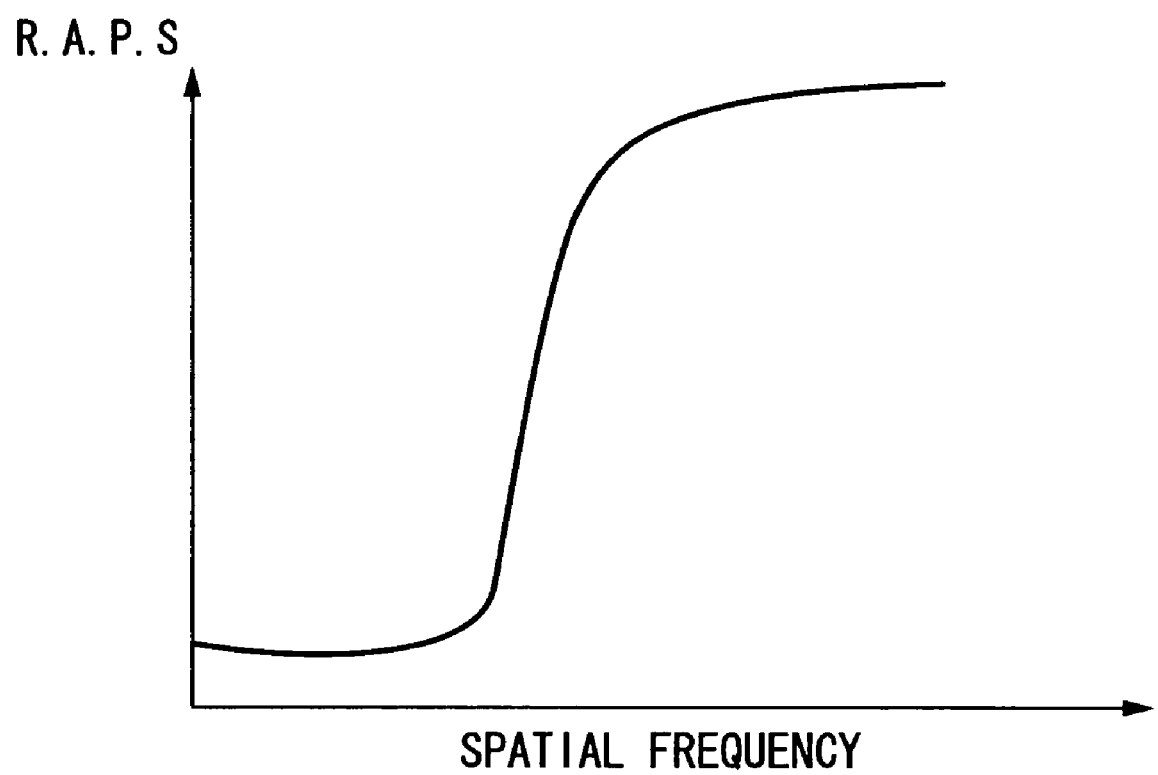
FIG. 16 is a typical R.A.P.S. graph of a dot arrangement having blue noise characteristics.

12 has the blue noise characteristics, and the graph shown in FIG. 16 illustrates a typical example of the blue noise characteristics.

The above-described method of creating the basic threshold value matrix M and the ejection failure countermeasure sub-matrices SM(X) based on same can be carried out by a computer device. For example, a program which causes a computer to implement the algorithms of the method of settling the ejection failure countermeasure sub-matrices shown in FIGS. 7 to 15 (namely, a threshold value matrix creating program) is prepared, and by operating a computer on the basis of this program, it is possible to make the computer function as a matrix creation device.

Figure 17:
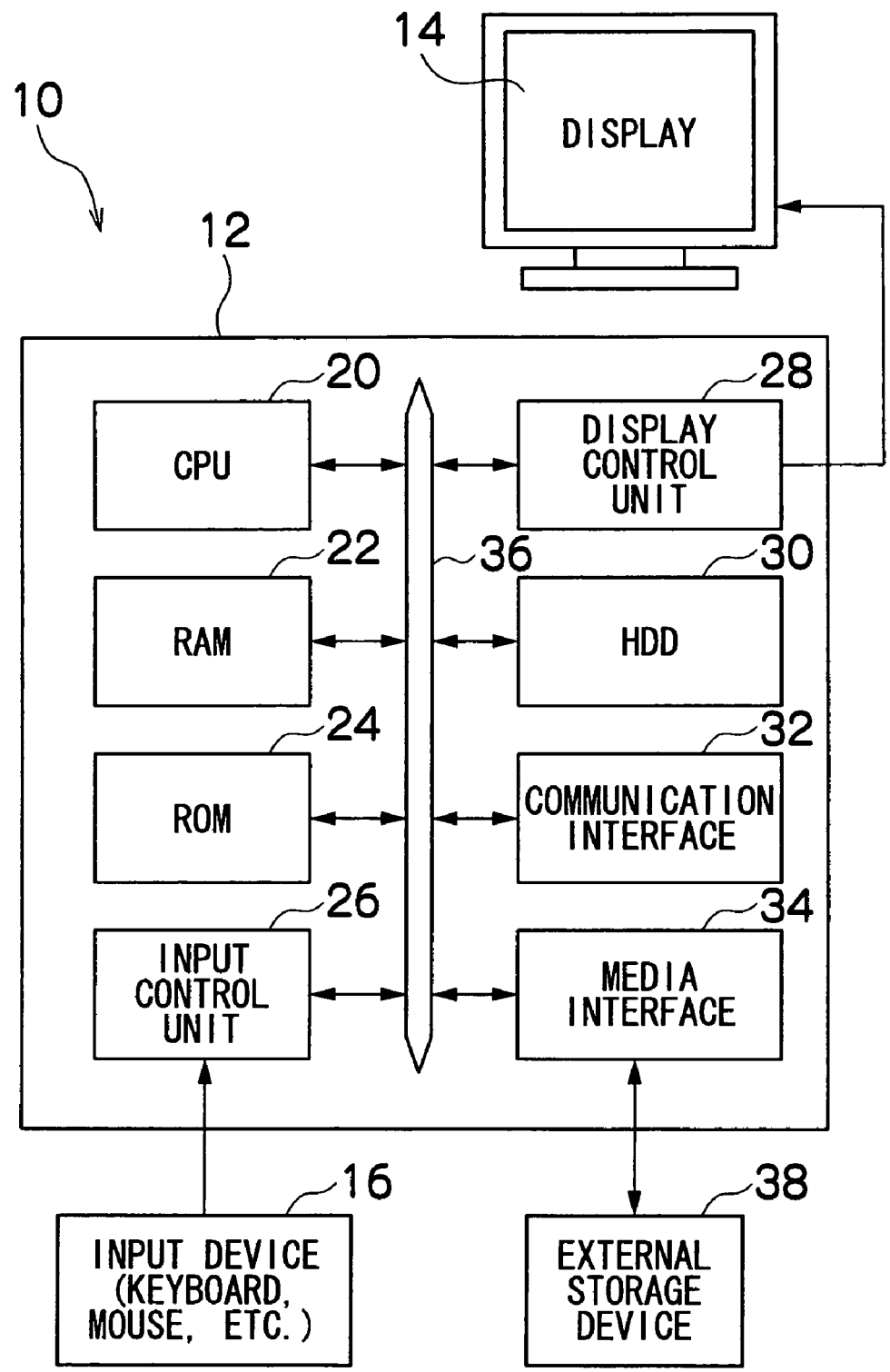
FIG. 17 is a block diagram showing an embodiment of the system composition of a computer which performs the threshold value matrix creating process and image processing according to an embodiment of the present invention.

FIG. 17 is a block diagram showing a structural example of a computer system. A computer 10 comprises a main body 12, a display (display device) 14, and an input device 16 such as a keyboard and a mouse (input device for inputting various commands). The main body 12 houses a central processing unit (CPU) 20, a RAM 22, ROM 24, an input control unit 26 which controls the input of signals from the input device 16, a display control unit 28 which outputs display signals to the display 14, a hard disk device 30, a communication interface 32, a media interface 34, and the like, and these respective circuits are mutually connected by means of a bus 36.

The CPU 20 functions as a general control device and computing device. The RAM 22 is used as a temporary data storage region, and as a work area during execution of the program by the CPU 20. The ROM 24 is a rewriteable non-volatile storage device which stores a boot program for operating the CPU 20, various settings values and network connection information, and the like. An operating system (OS) and various applicational software programs and data, and the like, are stored in the hard disk device 30.

The communication interface 32 is a device for connecting to an external device or communications network, on the basis of a prescribed communications system, such as USB, LAN, Bluetooth, or the like. The media interface 34 is a device which controls the reading and writing of the external storage device 38, which is typically a memory card, a magnetic disk, a magneto-optical disk, or an optical disk.

The dot arrangement specification processing program and threshold value matrix creating program according to the embodiment of the present invention are stored in the hard disk device 30 or the external storage device 38, and these programs are read out, developed in the RAM 22 and executed, according to requirements. Alternatively, it is also possible to adopt a mode in which programs are supplied by a server situated on a network (not shown) which is connected via the communication interface 32, or a mode in which a computation processing service based on the programs is supplied by a server based on the Internet.

By looking at the application window (not shown) displayed on the display 14 and operating the input device 16, the operator is able to input various values required for calculation, such as the size of the basic threshold value matrix and the size of the ejection failure countermeasure sub-matrix (width of a prescribed number of pixels), as well as being able to confirm the calculation results on the display 14.

The data of the basic threshold value matrix M and the ejection failure countermeasure sub-matrices SM(X) obtained by the aforementioned method is stored, and at the stage of actual image processing, the image is quantized (by digital halftoning) by using a reformed threshold matrix in which the portion of the basic threshold value matrix M corresponding to an ejection failure position is replaced with the ejection failure countermeasure sub-matrix SM(X) on the basis of the ejection failure position information.

Figure 10B:
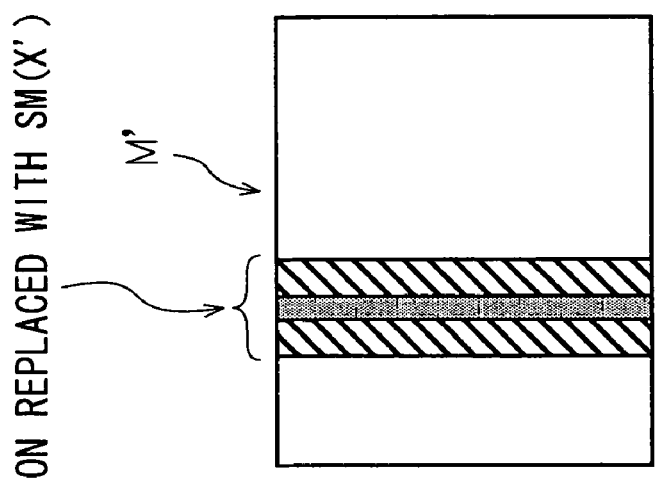
FIG. 10 is a conceptual diagram for explaining an embodiment of a processing method in a case where an ejection failure position is located in the end region of a basic threshold value matrix.
Figure 10A:
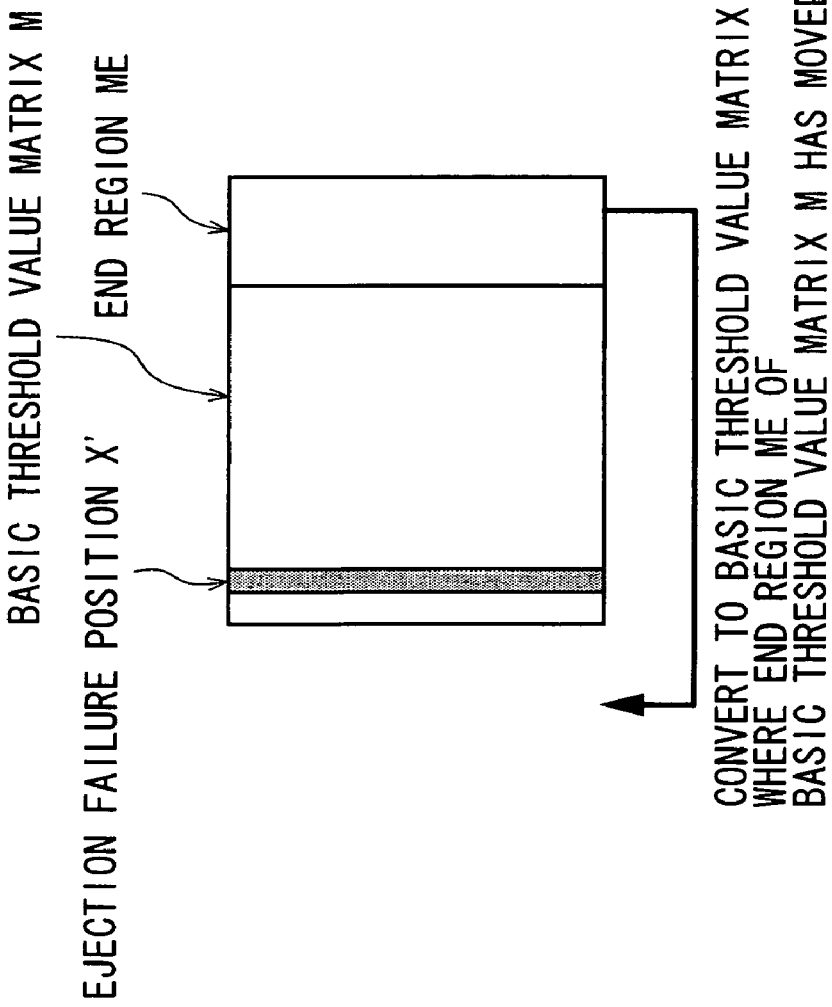
Figure 18:
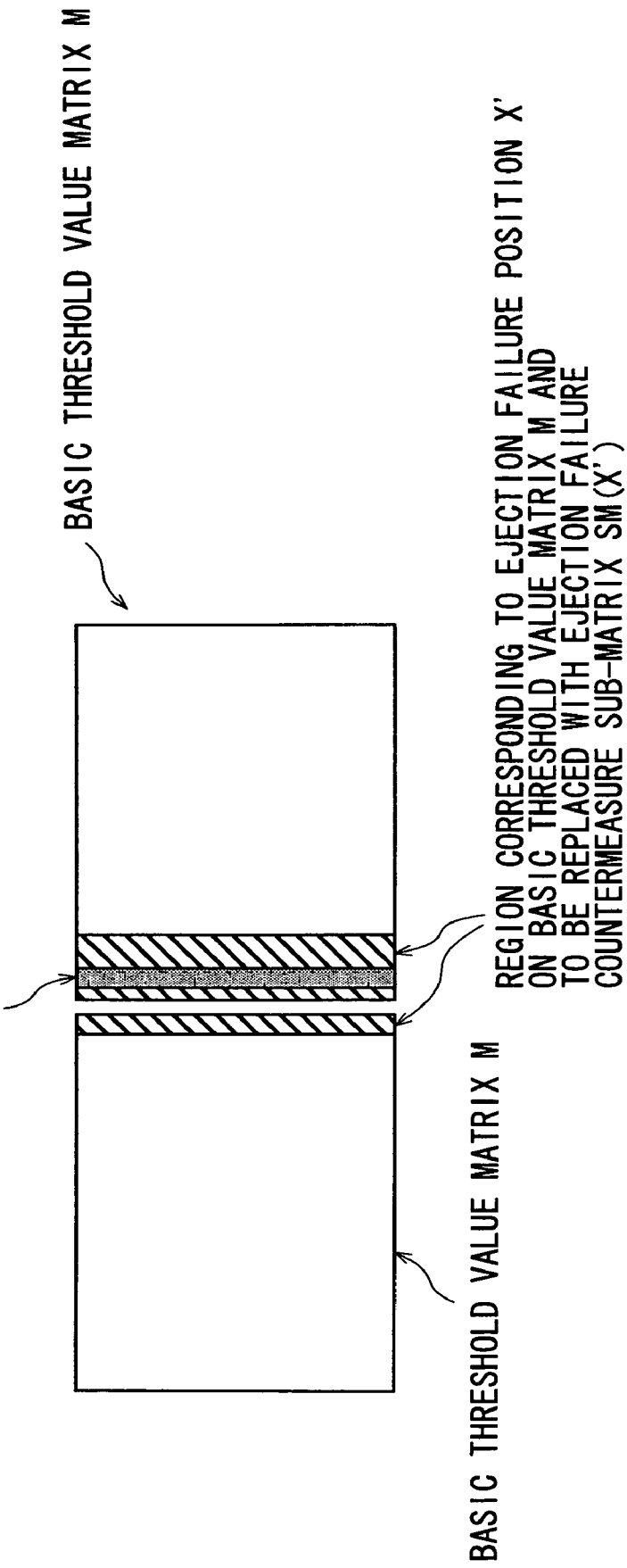
FIG. 18 is a conceptual diagram showing an example of a case where an ejection failure countermeasure sub-matrix relates to two, mutually adjacent, basic threshold value matrices.

In this case, as described with reference to FIG. 10, if the ejection failure position is in the end region of the basic threshold value matrix and the corresponding ejection failure countermeasure sub-matrix SM(X) projects beyond the basic threshold value matrix, then when calculating the ejection failure countermeasure sub-matrix SM(X), the processing shown in the right-hand side of FIG. 10 is implemented in order to settle the ejection failure countermeasure sub-matrix SM(X) (step S22 in FIG. 7), and in the stage of image processing, the ejection failure countermeasure sub-matrix SM(X) is substituted into the two basic threshold value matrices M that are mutually adjacent in the region corresponding to the ejection failure position X, as shown in FIG. 18.

Next, an embodiment of an image processing apparatus which carries out image processing by using the basic threshold value matrix and ejection failure countermeasure sub-matrices created by means of the threshold value matrix creating method described above is explained.

Composition of Image Processing Apparatus

Figure 19:
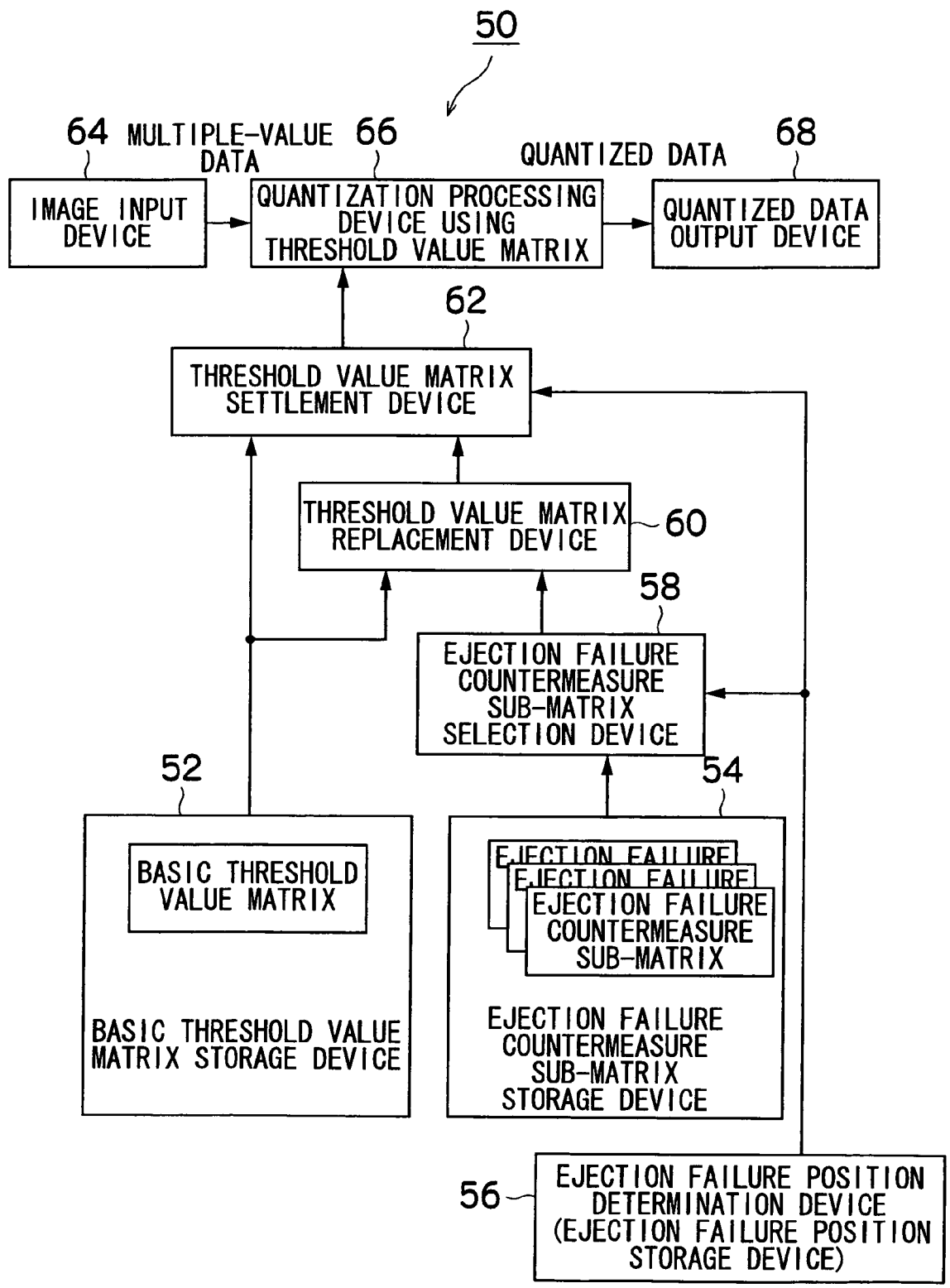
FIG. 19 is a block diagram showing the composition of an image processing apparatus according to an embodiment of the present invention.

FIG. 19 is a block diagram showing the composition of an image processing apparatus according to an embodiment of the present invention. As shown in FIG. 19, the image processing apparatus 50 according to the present embodiment comprises: a basic threshold value matrix storage device 52, which stores data for a basic threshold value matrix M; an ejection failure countermeasure sub-matrix storage device 54, which stores data for ejection failure countermeasure sub-matrices SM(X); an ejection failure position determination device 56, which determines ejection failure positions; an ejection failure countermeasure sub-matrix selection device 58, which selectively extracts the ejection failure countermeasure sub-matrix corresponding to the ejection failure position, from the ejection failure countermeasure sub-matrix storage device 54, on the basis of information relating to the ejection failure position obtained from the ejection failure position determination device 56; a threshold value matrix replacement device 60, which creates a threshold value matrix for application to the ejection failure position (hereinafter, called "reformed threshold value matrix") by replacing a portion of the basic threshold value matrix with the ejection failure countermeasure sub-matrix selected by the ejection failure countermeasure sub-matrix selection device 58; a threshold value matrix settlement device 62, which settles a threshold value matrix used for quantization in accordance with the image region (position) (namely, which selectively settles either the basic threshold value matrix or the reformed threshold value matrix); an image input device 64; a quantization processing device 66, which quantizes the input image (multiple-value data) by using the threshold value matrix settled by the threshold value matrix settlement device 62; and a quantization data output device 68, which outputs a dot image on the basis of the quantized data generated by the quantization processing device 66.

A non-volatile memory, such as an EEPROM, or a storage device such as a hard disk device, is suitable for use as the basic threshold value matrix storage device 52 and the ejection failure countermeasure sub-matrix storage device 54. It is possible to use separate memories (or storage devices) for the basic threshold value matrix storage device 52 and the ejection failure countermeasure sub-matrix storage device 54, or alternatively, the basic threshold value matrix storage device 52 and the ejection failure countermeasure sub-matrix storage device 54 may be constituted by dividing one memory (or storage device) into separate storage regions.

The ejection failure position determination device 56 comprises, for example, an image sensor which captures the print result of the test pattern, and an image processing device (calculation processing device) which analyzes the image data obtained by the image sensor, and ascertains the ejection failure positions. Alternatively, it is also possible to use an ejection failure position storage device, which stores information on the ejection failure positions as acquired beforehand by a separate device, instead of the ejection failure position determination device 56. For the "ejection failure position storage device" described here, it is suitable to use, for example, a non-volatile memory such as an EEPROM, or a storage device such as a hard disk device.

The ejection failure countermeasure sub-matrix selection device 58 reads out ejection failure countermeasure sub-matrix data corresponding to the ejection failure position, from the ejection failure countermeasure sub-matrix storage device 54 in accordance with the information on the ejection failure position obtained from the ejection failure position determination device (or the ejection failure position storage device) 56, and the ejection failure countermeasure sub-matrix selection device 58 supplies the read data to the threshold value matrix replacement device 60. The ejection failure countermeasure sub-matrix selection device 58 also functions as a replacement region determination device which determines the region for replacement containing the ejection failure position (the corresponding region having a width of a prescribed number of pixels) in the basic threshold value matrix.

The threshold value matrix replacement device 60 carries out processing for generating a reformed threshold value matrix in which a portion of the basic threshold value matrix read out from the basic threshold value matrix storage device 52 has been replaced with the ejection failure countermeasure sub-matrix supplied by the ejection failure countermeasure sub-matrix selection device 58. In other words, the threshold value matrix replacement device 60 also functions as a threshold value replacement device which replaces the threshold values of the corresponding region containing the ejection failure position on the basic threshold value matrix, with the ejection failure countermeasure sub-matrix.

The threshold value matrix settlement device 62 carries out processing for judging whether or not the ejection failure position is included in the region subject to quantization processing, and switching the threshold value matrix accordingly, on the basis of the information obtained from the ejection failure position determination device (or the ejection failure position storage device) 56.

The image input device 64 is an interface section which receives original image data prior to quantization (for example, multiple-value digital image data which represents 256 tone graduations). More specifically, the image input device 64 may also be a communication interface, or a media interface for removable media, or a memory controller which acquires data from a memory, or the like.

The multiple-value image data inputted through the image input device 64 is quantized by the quantization processing device 66, using the threshold value matrix settled by the threshold value matrix settlement device 62, and the image data is thereby converted into binary data, or, if the dot size is variable, into multiple-value quantized data corresponding to the number of different dot sizes. This process uses the reformed threshold value matrix in which the ejection failure countermeasure sub-matrix has been incorporated into the image region containing the ejection failure position. Accordingly, it is possible to obtain satisfactory quantization data (dot data) in which the artifact due to the ejection failure is not conspicuous.

The various devices, such as the ejection failure countermeasure sub-matrix selection device 58, the threshold value matrix replacement device 60, the threshold value matrix specification device 62 and the quantization processing device 66, may be realized by means of software.

The quantization data output device 68 corresponds to an image forming unit including a print head (liquid ejection head) which is driven on the basis of the quantization data (dot data) generated by the quantization processing device 66. By supplying the quantization data generated by the quantization processing device 66 to the quantization data output device 68, an image is printed onto recording paper, or another medium, by the quantization data output device 68.

According to the image processing apparatus 50 in the present embodiment, the optimal ejection failure countermeasure sub-matrix is selected suitably in accordance with the ejection failure position, and the threshold value matrix is adopted in which the portion of the basic threshold value matrix is replaced with this ejection failure countermeasure sub-matrix. Therefore, it is possible to form a desirable image in which an artifact caused by the ejection failure is not conspicuous.

The plurality of ejection failure countermeasure sub-matrices are prepared in accordance with the positions where the ejection failure occurs, but since each of the ejection failure countermeasure sub-matrices has a relatively small size (prescribed width), namely, approximately 3 through 9 pixels, then only a relatively small storage capacity is required to store this data in the ejection failure countermeasure sub-matrix storage device. Furthermore, since a composition is adopted in which a threshold value matrix adapted to the ejection failure position is generated by replacing a portion of the basic threshold value matrix with an ejection failure countermeasure sub-matrix in accordance with the ejection failure position, then the total volume of data required to hold threshold value matrices capable of adapting to a plurality of ejection failure positions is relatively small. Therefore, compared to a composition in which a plurality of ejection failure countermeasure matrices (whole matrices) are prepared to correspond to the ejection failure positions, as in the related art disclosed in Japanese Patent Application Publication No. 2004-202795, it is possible in the present embodiment to reduce the storage volume of the data corresponding to the basic threshold value matrix and the ejection failure countermeasure sub-matrices (namely, the sum of the storage volume of the basic threshold value matrix storage device and storage volume of the ejection failure countermeasure sub-matrix storage device).

If ejection failures have occurred in a plurality of positions within the basic threshold value matrix, then replacement (switching) of the threshold values by means of an appropriate ejection failure countermeasure sub-matrix is carried out for each of the regions corresponding to the ejection failure positions. In this case, it may occur that the plurality of ejection failure positions are close to each other and the ejection failure countermeasure sub-matrices corresponding to the respective ejection failure positions may overlap with each other, but in situations like this, the combination of the plurality of ejection failure countermeasure matrices is controlled and changed in such a manner that a smaller matrix size (width of a prescribed number of pixels) is used for either one or both of the ejection failure countermeasure sub-matrices, thus preventing the replaced regions from overlapping with each other. This control of the combination of ejection failure countermeasure matrices is performed by the ejection failure countermeasure sub-matrix selection device 58, on the basis of information supplied by the ejection failure position determination device 56.

Next, an inkjet recording apparatus is described as a concrete embodiment of the application of the image processing apparatus 50 described above.

Figure 20:
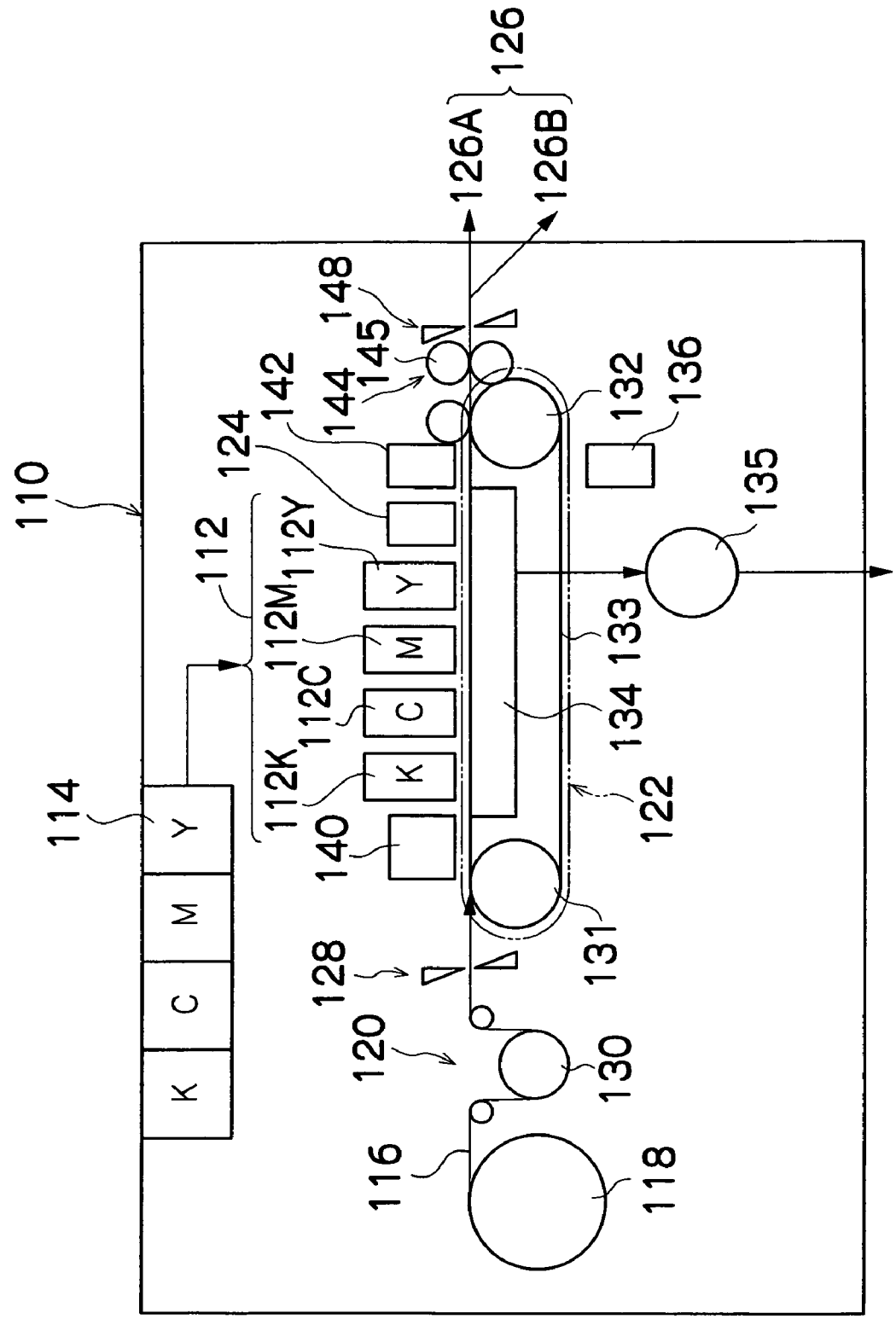
FIG. 20 is a general schematic drawing of an inkjet recording apparatus which forms an image forming apparatus according to an embodiment of the present invention.

FIG. 20 is a general schematic drawing of the inkjet recording apparatus which forms an image processing apparatus according to an embodiment of the present invention. As shown in FIG. 20, the inkjet recording apparatus 110 comprises: a printing unit 112 having a plurality of inkjet recording heads (hereafter, called "heads") 112K, 112C, 112M, and 112Y provided for ink colors of black (K), cyan (C), magenta (M), and yellow (Y), respectively; an ink storing and loading unit 114 for storing inks of K, C, M and Y to be supplied to the print heads 112K, 112C, 112M, and 112Y; a paper supply unit 118 for supplying recording paper 116 which is a recording medium; a decurling unit 120 removing curl in the recording paper 116; a belt conveyance unit 122 disposed facing the nozzle face (ink-droplet ejection face) of the printing unit 112, for conveying the recording paper 116 while keeping the recording paper 116 flat; a print determination unit 124 for reading the printed result produced by the printing unit 112; and a paper output unit 126 for outputting image-printed recording paper (printed matter) to the exterior.

The ink storing and loading unit 114 has ink tanks for storing the inks of K, C, M and Y to be supplied to the heads 112K, 112C, 112M, and 112Y, and the tanks are connected to the heads 112K, 112C, 112M, and 112Y by means of prescribed channels. The ink storing and loading unit 114 has a warning device (for example, a display device or an alarm sound generator) for warning when the remaining amount of any ink is low, and has a mechanism for preventing loading errors among the colors.

In FIG. 20, a magazine for rolled paper (continuous paper) is shown as an embodiment of the paper supply unit 118; however, more magazines with paper differences such as paper width and quality may be jointly provided. Moreover, papers may be supplied with cassettes that contain cut papers loaded in layers and that are used jointly or in lieu of the magazine for rolled paper.

In the case of a configuration in which a plurality of types of recording medium can be used, it is preferable that an information recording medium such as a bar code and a wireless tag containing information about the type of medium is attached to the magazine, and by reading the information contained in the information recording medium with a predetermined reading device, the type of recording medium (type of medium) to be used is automatically determined, and ink-droplet ejection is controlled so that the ink-droplets are ejected in an appropriate manner in accordance with the type of medium.

The recording paper 116 delivered from the paper supply unit 118 retains curl due to having been loaded in the magazine. In order to remove the curl, heat is applied to the recording paper 116 in the decurling unit 120 by a heating drum 130 in the direction opposite from the curl direction in the magazine. The heating temperature at this time is preferably controlled so that the recording paper 116 has a curl in which the surface on which the print is to be made is slightly round outward.

In the case of the configuration in which roll paper is used, a cutter (first cutter) 128 is provided as shown in FIG. 20, and the continuous paper is cut into a desired size by the cutter 128. When cut papers are used, the cutter 128 is not required.

The decurled and cut recording paper 116 is delivered to the belt conveyance unit 122. The belt conveyance unit 122 has a configuration in which an endless belt 133 is set around rollers 131 and 132 so that the portion of the endless belt 133 facing at least the nozzle face of the printing unit 112 and the sensor face of the print determination unit 124 forms a horizontal plane (flat plane).

The belt 133 has a width that is greater than the width of the recording paper 116, and a plurality of suction apertures (not shown) are formed on the belt surface. A suction chamber 134 is disposed in a position facing the sensor surface of the print determination unit 24 and the nozzle surface of the printing unit 112 on the interior side of the belt 133, which is set around the rollers 131 and 132, as shown in FIG. 20. The suction chamber 134 provides suction with a fan 135 to generate a negative pressure, and the recording paper 116 is held on the belt 133 by suction. It should be noted that electrostatic suction method may be employed instead of adsorption-suction method.

The belt 133 is driven in the clockwise direction in FIG. 20 by the motive force of a motor 188 (shown in FIG. 25) being transmitted to at least one of the rollers 131 and 132, which the belt 133 is set around, and the recording paper 116 held on the belt 133 is conveyed from left to right in FIG. 20.

Since ink adheres to the belt 133 when a marginless print job or the like is performed, a belt-cleaning unit 136 is disposed in a predetermined position (a suitable position outside the printing area) on the exterior side of the belt 133. Although the details of the configuration of the belt-cleaning unit 136 are not shown, embodiments thereof include a configuration in which the belt 133 is nipped with cleaning rollers such as a brush roller and a water absorbent roller, an air blow configuration in which clean air is blown onto the belt 133, or a combination of these. In the case of the configuration in which the belt 133 is nipped with the cleaning rollers, it is preferable to make the line velocity of the cleaning rollers different than that of the belt 133 to improve the cleaning effect.

The inkjet recording apparatus 110 can comprise a roller nip conveyance mechanism instead of the belt conveyance unit 122. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 140 is disposed on the upstream side of the printing unit 112 in the conveyance pathway formed by the belt conveyance unit 122. The heating fan 140 blows heated air onto the recording paper 116 to heat the recording paper 116 immediately before printing so that the ink deposited on the recording paper 116 dries more easily.

Figure 21:
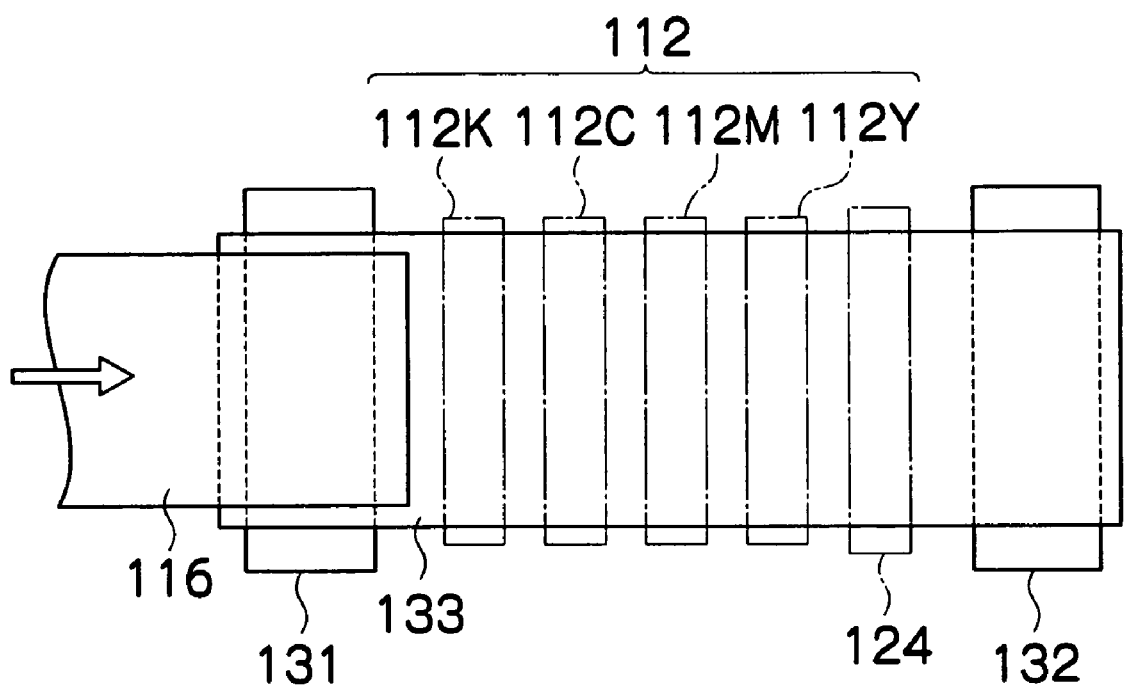
FIG. 21 is a principal plan diagram of the peripheral area of a print unit in the inkjet recording apparatus shown in FIG. 20.

The heads 112K, 112C, 112M and 112Y of the printing unit 112 are full line heads having a length corresponding to the maximum width of the recording paper 116 used with the inkjet recording apparatus 110, and comprising a plurality of nozzles for ejecting ink arranged on a nozzle face through a length exceeding at least one edge of the maximum-size recording medium (namely, the full width of the printable range) (see FIG. 21).

The print heads 112K, 112C, 112M and 112Y are arranged in color order (black (K), cyan (C), magenta (M), yellow (Y)) from the upstream side in the feed direction of the recording paper 116, and these respective heads 112K, 112C, 112M and 112Y are fixed extending in a direction substantially perpendicular to the conveyance direction of the recording paper 116.

A color image can be formed on the recording paper 116 by ejecting inks of different colors from the heads 112K, 112C, 112M and 112Y, respectively, onto the recording paper 116 while the recording paper 116 is conveyed by the belt conveyance unit 122.

By adopting a configuration in which the full line heads 112K, 112C, 112M and 112Y having nozzle rows covering the full paper width are provided for the respective colors in this way, it is possible to record an image on the full surface of the recording paper 116 by performing just one operation of relatively moving the recording paper 116 and the printing unit 112 in the paper conveyance direction (the sub-scanning direction), in other words, by means of a single sub-scanning action. Higher-speed printing is thereby made possible and productivity can be improved in comparison with a shuttle type head configuration in which a recording head reciprocates in the main scanning direction.

Although the configuration with the KCMY four standard colors is described in the present embodiment, combinations of the ink colors and the number of colors are not limited to those. Light inks, dark inks or special color inks can be added as required. For example, a configuration is possible in which inkjet heads for ejecting light-colored inks such as light cyan and light magenta are added. Furthermore, there are no particular restrictions of the sequence in which the heads of respective colors are arranged.

The print determination unit 124 shown in FIG. 20 has an image sensor (line sensor or area sensor) for capturing an image of the droplet ejection result of the print unit 112, and functions as a device to check for ejection defects such as blockages, landing position displacement, and the like, of the nozzles, on the basis of the image of ejected droplets read in by the image sensor. A test pattern or the target image printed by the print heads 112K, 112C, 112M, and 112Y of the respective colors is read in by the print determination unit 124, and the ejection performed by each head is determined. The ejection determination includes detection of the ejection, measurement of the dot size, and measurement of the dot formation position.

A post-drying unit 142 is disposed following the print determination unit 124. The post-drying unit 142 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 144 is disposed following the post-drying unit 142. The heating/pressurizing unit 144 is a device to control the glossiness of the image surface, and the image surface is pressed with a pressure roller 145 having a predetermined uneven surface shape while the image surface is heated, and the uneven shape is transferred to the image surface.

The printed matter generated in this manner is outputted from the paper output unit 126. The target print (i.e., the result of printing the target image) and the test print are preferably outputted separately. In the inkjet recording apparatus 110, a sorting device (not shown) is provided for switching the outputting pathways in order to sort the printed matter with the target print and the printed matter with the test print, and to send them to paper output units 126A and 126B, respectively. When the target print and the test print are simultaneously formed in parallel on the same large sheet of paper, the test print portion is cut and separated by a cutter (second cutter) 148. Although not shown in FIG. 20, the paper output unit 126A for the target prints is provided with a sorter for collecting prints according to print orders.

Structure of Head

Next, the structure of the heads is described. The heads 112K, 112C, 112M and 112Y of the respective ink colors have the same structure, and a reference numeral 150 is hereinafter designated to any of the heads.

Figure 23:
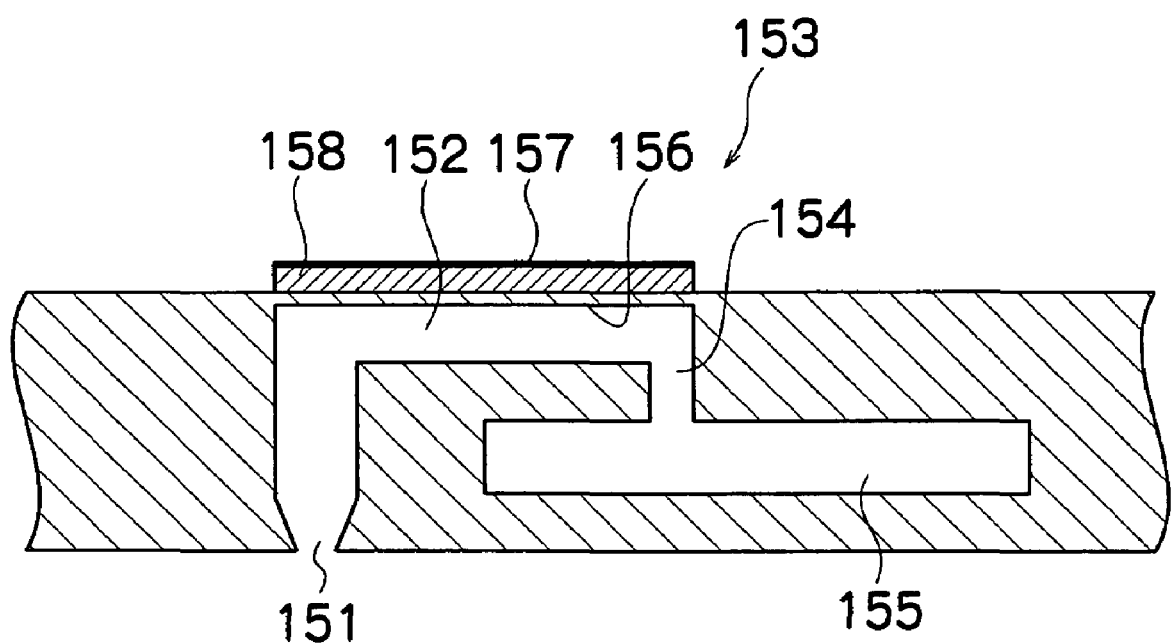
FIG. 23 is a cross-sectional view along line 23-23 in FIGS. 22A and 22B.

FIG. 22A is a perspective plan view showing an embodiment of the configuration of the head 150, FIG. 22B is an enlarged view of a portion thereof, FIG. 22C is a perspective plan view showing another embodiment of the configuration of the head 150', and FIG. 23 is a cross-sectional view taken along the line 23-23 in FIGS. 22A and 22B, showing the inner structure of a droplet ejection element (an ink chamber unit for one nozzle 151).

The nozzle pitch in the head 150 should be minimized in order to maximize the resolution of the dots printed on the surface of the recording paper 116. As shown in FIGS. 22A and 22B, the head 150 according to the present embodiment has a structure in which a plurality of ink chamber units (droplet ejection elements) 153, each comprising a nozzle 151 forming an ink ejection port, a pressure chamber 152 corresponding to the nozzle 151, and the like, are disposed two-dimensionally in the form of a staggered matrix, and hence the effective nozzle interval (the projected nozzle pitch) as projected in the lengthwise direction of the head (the direction perpendicular to the paper conveyance direction) is reduced and high nozzle density is achieved.

The mode of forming one or more nozzle rows through a length corresponding to the entire width of the recording paper 116 in a direction substantially perpendicular to the conveyance direction of the recording paper 116 is not limited to the embodiment described above. For example, instead of the configuration in FIG. 22A, as shown in FIG. 22C, a line head having nozzle rows of a length corresponding to the entire width of the recording paper 116 can be formed by arranging and combining, in a staggered matrix, short head modules 150' having a plurality of nozzles 151 arrayed in a two-dimensional fashion.

As shown in FIGS. 22A and 22B, the planar shape of the pressure chamber 152 provided corresponding to each nozzle 151 is substantially a square shape, and an outlet port to the nozzle 151 is provided at one of the ends of the diagonal line of the planar shape, while an inlet port (supply port) 154 for supplying ink is provided at the other end thereof. The shape of the pressure chamber 152 is not limited to that of the present embodiment and various modes are possible in which the planar shape is a quadrilateral shape (rhombic shape, rectangular shape, or the like), a pentagonal shape, a hexagonal shape, or other polygonal shape, or a circular shape, elliptical shape, or the like.

As shown in FIG. 23, each pressure chamber 152 is connected to a common channel 155 through the supply port 154. The common channel 155 is connected to an ink tank (not shown), which is a base tank that supplies ink, and the ink supplied from the ink tank is delivered through the common flow channel 155 to the pressure chambers 152.

An actuator 158 provided with an individual electrode 157 is bonded to a pressure plate (a diaphragm that also serves as a common electrode) 156 which forms the surface of one portion (in FIG. 23, the ceiling) of the pressure chambers 152. When a drive voltage is applied to the individual electrode 157 and the common electrode, the actuator 158 deforms, thereby changing the volume of the pressure chamber 152. This causes a pressure change which results in ink being ejected from the nozzle 151. For the actuator 158, it is possible to adopt a piezoelectric element using a piezoelectric body, such as lead zirconate titanate, barium titanate, or the like. When the displacement of the actuator 158 returns to its original position after ejecting ink, new ink is supplied to the pressure chamber 152 from the common liquid chamber 155, via the supply port 154.

Figure 24:
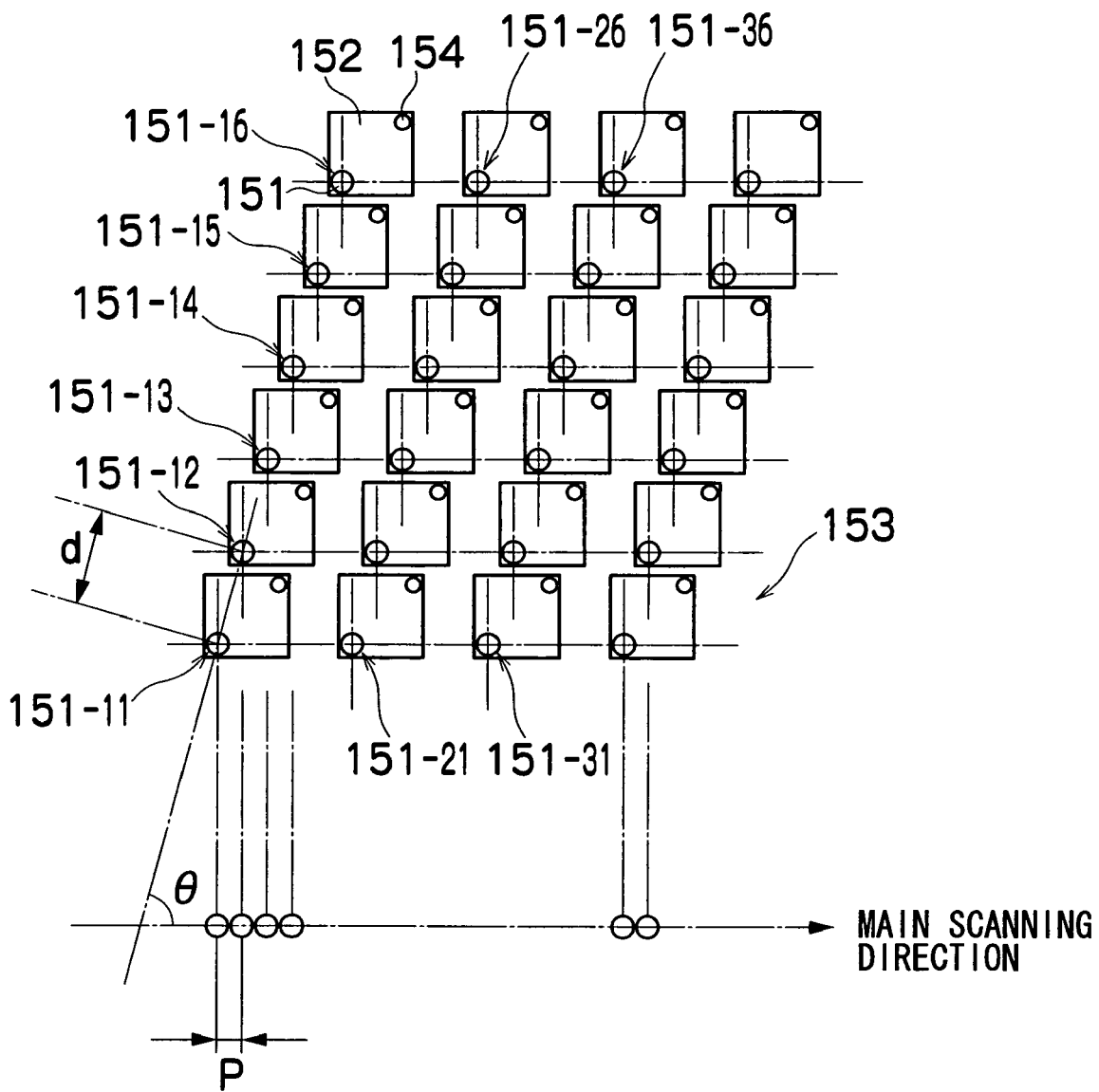
FIG. 24 is an enlarged view showing a nozzle arrangement in the print head shown in FIG. 22A.

As shown in FIG. 24, the high-density nozzle head according to the present embodiment is achieved by arranging the plurality of ink chamber units 153 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which the plurality of ink chamber units 153 are arranged at a uniform pitch d in line with a direction forming an angle of θ with respect to the main scanning direction, the pitch P of the nozzles projected so as to align in the main scanning direction is d×cos θ, and hence the nozzles 151 can be regarded to be equivalent to those arranged linearly at the fixed pitch P along the main scanning direction. Such configuration results in a nozzle structure in which the nozzle row projected in the main scanning direction has a high nozzle density of up to 2,400 nozzles per inch.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 151 arranged in a matrix such as that shown in FIG. 24 are driven, the main scanning according to the above-described (3) is preferred. More specifically, the nozzles 151-11, 151-12, 151-13, 151-14, 151-15 and 151-16 are treated as a block (additionally; the nozzles 151-21, 151-22, . . . , 151-26 are treated as another block; the nozzles 151-31, 151-32, . . . , 151-36 are treated as another block; . . . ); and one line is printed in the width direction of the recording paper 116 by sequentially driving the nozzles 151-11, 151-12, . . . , 151-16 in accordance with the conveyance velocity of the recording paper 116.

On the other hand, "sub-scanning" is defined as to repeatedly perform printing of one line (a line formed of a row of dots, or a line formed of a plurality of rows of dots) formed by the main scanning, while moving the full-line head and the recording paper relative to each other.

The direction indicated by one line (or the lengthwise direction of a band-shaped region) recorded by main scanning as described above is called the "main scanning direction", and the direction in which sub-scanning is performed, is called the "sub-scanning direction". In other words, in the present embodiment, the conveyance direction of the recording paper 116 is called the sub-scanning direction and the direction perpendicular to same is called the main scanning direction.

In implementing the present invention, the arrangement of the nozzles is not limited to that of the embodiment illustrated. Moreover, a method is employed in the present embodiment where an ink droplet is ejected by means of the deformation of the actuator 158, which is typically a piezoelectric element; however, in implementing the present invention, the method used for discharging ink is not limited in particular, and instead of the piezo jet method, it is also possible to apply various types of methods, such as a thermal jet method where the ink is heated and bubbles are caused to form therein by means of a heat generating body such as a heater, ink droplets being ejected by means of the pressure applied by these bubbles.

Description of Control System

Figure 25:
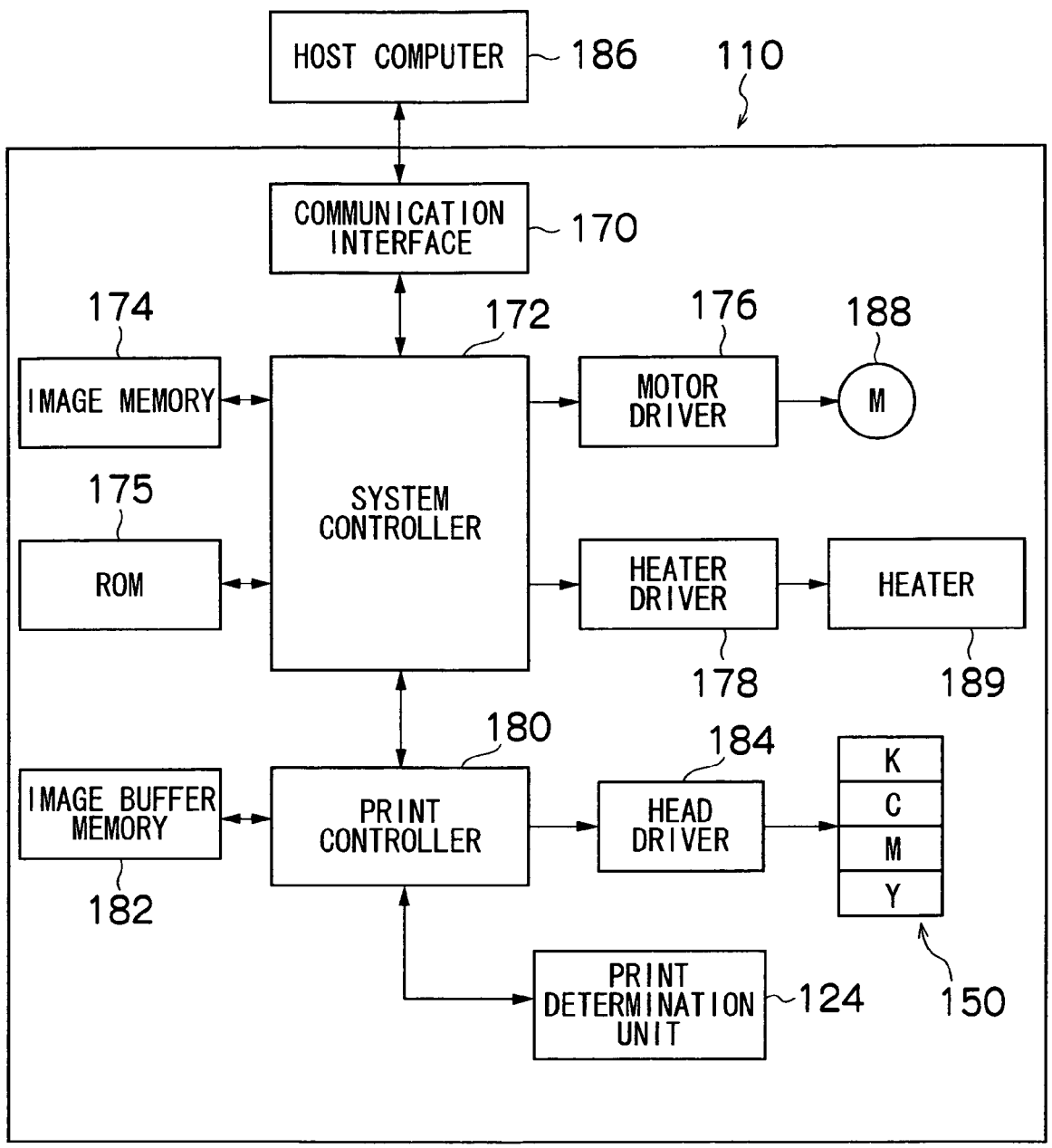
FIG. 25 is a principal block diagram showing the system configuration of the inkjet recording apparatus.

FIG. 25 is a principal block diagram showing the system configuration of the inkjet recording apparatus 110. As shown in FIG. 25, the inkjet recording apparatus 110 comprises a communication interface 170, a system controller 172, an image memory 174, a ROM 175, a motor driver 176, a heater driver 178, a print controller 180, an image buffer memory 182, a head driver 184, and the like.

The communication interface 170 is an interface unit for receiving image data sent from a host computer 186. A serial interface such as USB, IEEE1394, Ethernet, wireless network, or a parallel interface such as a Centronics interface may be used as the communication interface 170. A buffer memory (not shown) may be mounted in this portion in order to increase the communication speed.

The image data sent from the host computer 186 is received by the inkjet recording apparatus 110 through the communication interface 170, and is temporarily stored in the image memory 174. The image memory 174 is a storage device for storing images inputted through the communication interface 170, and data is written and read to and from the image memory 174 through the system controller 172. The image memory 174 is not limited to a memory composed of semiconductor elements, and a hard disk drive or another magnetic medium may be used.

The system controller 172 is constituted by a central processing unit (CPU) and peripheral circuits thereof, and the like, and it functions as a control device for controlling the whole of the inkjet recording apparatus 110 in accordance with a prescribed program, as well as a calculation device for performing various calculations. More specifically, the system controller 172 controls the various sections, such as the communication interface 170, image memory 174, motor driver 176, heater driver 178, and the like, as well as controlling communications with the host computer 186 and writing and reading to and from the image memory 174 and ROM 175, and it also generates control signals for controlling the motor 188 and heater 189 of the conveyance system.

The program executed by the CPU of the system controller 172 and the various types of data which are required for control procedures are stored in the ROM 175. The ROM 175 may be a non-writeable storage device, or it may be a rewriteable storage device, such as an EEPROM. The image memory 174 is used as a temporary storage region for the image data, and it is also used as a program development region and a calculation work region for the CPU.

The motor driver (drive circuit) 176 drives the motor 188 of the conveyance system in accordance with commands from the system controller 172. The heater driver (drive circuit) 178 drives the heater 189 of the post-drying unit 142 or the like in accordance with commands from the system controller 172.

The print controller 180 has a signal processing function for performing various tasks, compensations, and other types of processing for generating print control signals from the image data (original image data) stored in the image memory 174 in accordance with commands from the system controller 172 so as to supply the generated print data (dot data) to the head driver 184. The print controller 180 comprises the ejection failure countermeasure sub-matrix selection device 58, the threshold value matrix replacement device 60, the threshold value matrix settlement device 62 and the quantization processing device 66 shown in FIG. 19, and the print controller 180 performs the functions of the image processing device according to the embodiment of the present invention.

The image buffer memory 182 is provided in the print controller 180, and image data, parameters, and other data are temporarily stored in the image buffer memory 182 when image data is processed in the print controller 180. FIG. 25 shows a mode in which the image buffer memory 182 is attached to the print controller 180; however, the image memory 174 may also serve as the image buffer memory 182. Also possible is a mode in which the print controller 180 and the system controller 172 are integrated to form a single processor.

To give a general description of the sequence of processing from image input to print output, image data to be printed (original image data) is inputted from an external source via a communications interface 170, and is accumulated in the image memory 174. At this stage, RGB image data is stored in the image memory 174, for example.

In the inkjet recording apparatus 110, an image which appears to have a continuous tonal graduation to the human eye is formed by changing the droplet ejection density and the dot size of fine dots created by ink (coloring material), and therefore, it is necessary to convert the input digital image into a dot pattern which reproduces the tonal graduations of the image (namely, the light and shade toning of the image) as faithfully as possible. Therefore, original image data (RGB data) stored in the image memory 174 is sent to the print controller 180 through the system controller 172, and is converted into dot data for each ink color by a half-toning technique, using the threshold value matrix, in the print controller 180.

In other words, the print controller 180 performs processing for converting the input RGB image data into dot data for the four colors of K, C, M and Y. The threshold value matrices created according to the embodiment of the present invention are incorporated in the print controller 180, and are used when converting the original image into the dot data. In this way, the dot data generated by the print controller 180 is stored in the image buffer memory 182.

The head driver 184 outputs drive signals for driving the actuators 158 corresponding to the respective nozzles 151 of the print head 150, on the basis of the print data supplied by the print controller 180 (in other words, the dot data stored in the image buffer memory 182). A feedback control system for maintaining constant drive conditions in the head may be included in the head driver 184.

By supplying the drive signals outputted by the head driver 184 to the print head 150, ink is ejected from the corresponding nozzles 151. By controlling ink ejection from the print head 150 in synchronization with the conveyance speed of the recording paper 116, an image is formed on the recording paper 116.

As described above, the ejection volume and the ejection timing of the ink droplets from the respective nozzles are controlled via the head driver 184, on the basis of the dot data generated by implementing prescribed signal processing in the print controller 180. By this means, prescribed dot size and dot positions can be achieved.

As described with reference to FIG. 20, the print determination unit 124 is a block including an image sensor, which reads in the image printed on the recording paper 116, performs various signal processing operations, and the like, and determines the print situation (presence/absence of ejection, variation in droplet ejection, optical density, and the like), these determination results being supplied to the print controller 180. In other words, the print determination unit 124 performs the function of the ejection failure position determination device 56 described with reference to FIG. 19. Instead of or in conjunction with this print determination unit 124, it is also possible to provide another ejection determination device (corresponding to an ejection abnormality determination device).

As a further ejection determination device, it is possible to adopt, for example, a mode (internal determination method) in which a pressure sensor is provided inside or in the vicinity of each pressure chamber 152 of the print head 150, and ejection abnormalities are detected from the determination signals obtained from these pressure sensors when ink is ejected or when the actuators are driven in order to measure the pressure. Alternatively, it is also possible to adopt a mode (external determination method) using an optical determination system comprising a light source, such as a laser light emitting element, and a photoreceptor element, whereby light, such as laser light, is irradiated onto the ink droplets ejected from the nozzles and the droplets in flight are determined by means of the transmitted light quantity (received light quantity).

The print controller 180 sets the threshold value matrix and implements various corrections with respect to the head 150, on the basis of the information obtained from the print determination unit 124 or another ejection determination device (not shown), according to requirements, and it implements control for carrying out cleaning operations (nozzle restoring operations), such as preliminary ejection, suctioning, or wiping, as and when necessary.

According to the inkjet recording apparatus 110 having the composition described above, even if there is a nozzle that is suffering an ejection failure, it is possible to obtain a satisfactory image in which there is little decline in image quality due to missing dots.

In the present embodiment, an inkjet recording apparatus having a full line type print head is described, but the scope of application of the present invention is not limited to this. For example, as shown in FIGS. 26A and 26B, it is also possible to apply the present invention to a case where an image is formed by using a line head (hereinafter called "print head 250") having a length which does not reach the width Wm of the recording medium (recording paper 116 or another print medium) 216, and by scanning the recording medium 216 by the print head 250 by a plurality of times.

In FIGS. 26A and 26B, the bidirectional arrows 250A shown inside the print head 250 are a schematic representation of the nozzle alignment direction and the length of the nozzle columns, and the large arrows 252 indicate the direction of scanning of the recording medium 216 by the print head 250. FIG. 26A shows a case of a first scanning action, and FIG. 26B shows a case of an Nth scanning action (where N is an integer of 2 or greater) performed by changing the scanning position.

As shown in FIGS. 26A and 26B, the print head 250 is disposed with its lengthwise direction (nozzle alignment direction) disposed in line with the breadthways direction of the recording paper 216, and the print head 250 is supported movably in the scanning direction (the direction of the arrow 252) and the breadthways direction of the recording paper 216 (the lateral direction in FIGS. 26A and 26B), by means of a head moving device (not shown) (which includes a supporting mechanism, such as a carriage, traveling guide, and the like, and a motor for driving same, and the like).

An image is formed on the recording medium 216 by carrying out a plurality of scanning actions in the scanning direction 252 of the print head, while altering the position of the print head 250 (scanning position) with respect to the breadthways direction of the recording paper 216.

Here, an embodiment is described in which the print head 250 is moved, but scanning is performed by moving the print head 250 relatively with respect to the recording paper 216, and therefore a mode in which the recording paper 216 is moved, or a mode in which scanning is performed by combining movement of both the print head 250 and the recording paper 216, are also possible.

Figure 27:
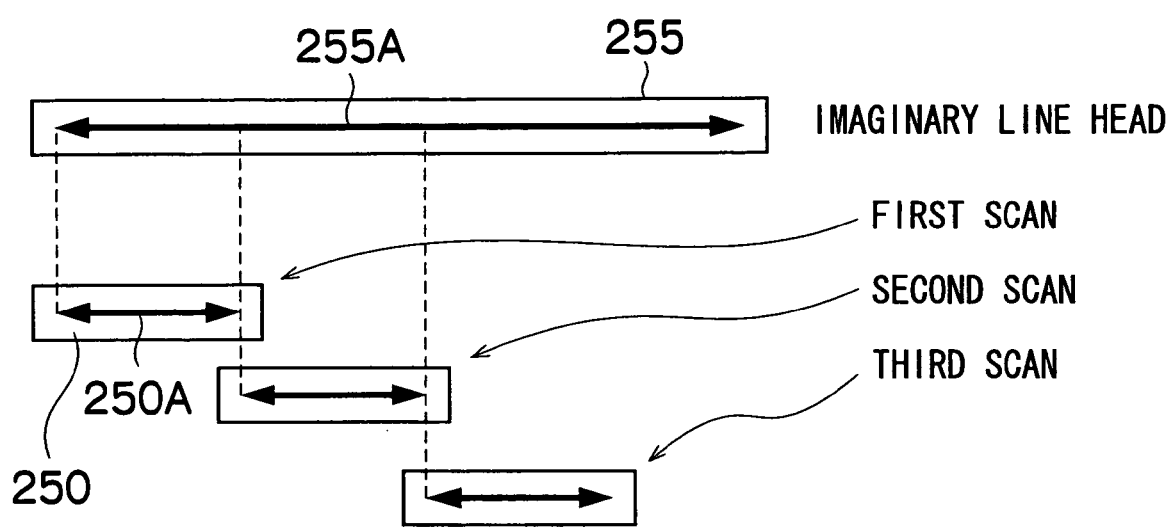
FIG. 27 is an illustrative diagram showing the relationship between a plurality of scanning actions, and an imaginary line head.

As shown in FIGS. 26A and 26B, the recording paper 216 is scanned with the print head 250 through different positions in the respective scanning actions, and by regarding the nozzles which are moved relatively over the recording paper 216 by these scanning actions as nozzles in positions corresponding to an imaginary line head 255 of the width (Wm) of the recording medium, as shown in FIG. 27, then it is possible to consider the print head 250 to be a portion of this imaginary line head 255, which has nozzle rows 255A of a length corresponding to the width Wm of the recording medium 216. In other words, the present invention may be applied in a similar fashion to the embodiment of the full line head 150 described above, to the imaginary line head (full line head) 255 of this kind.

Figure 28A:
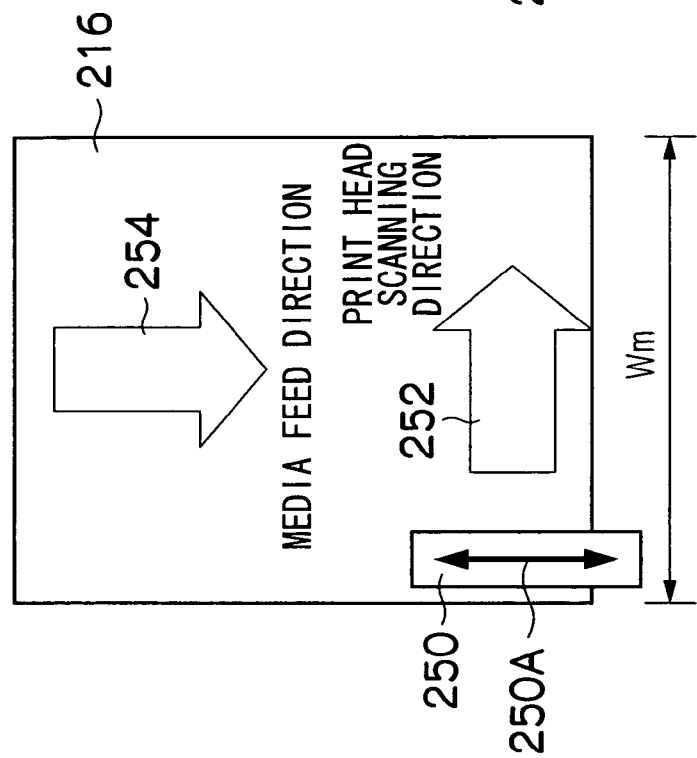
FIGS. 28A and 28B are schematic diagrams showing a further example in which an image is formed using a scanning print head.
Figure 28B:
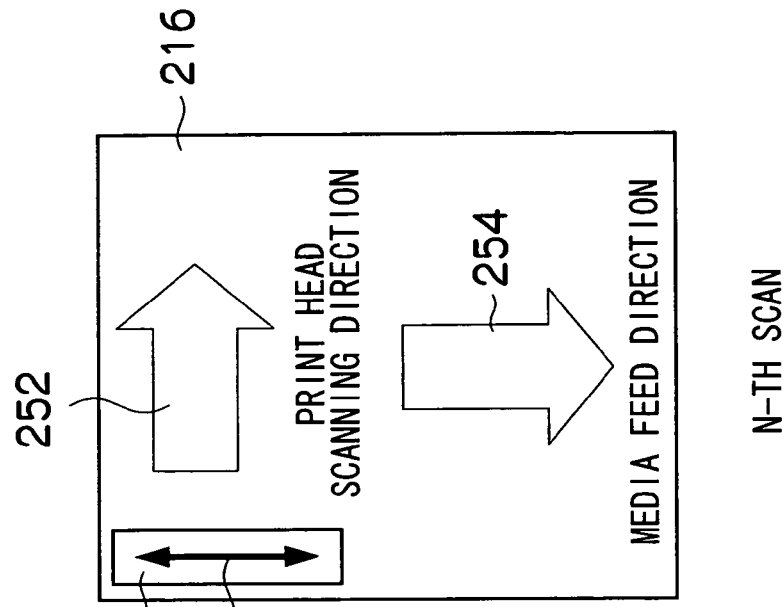

Furthermore, as shown in FIGS. 28A and 28B, cases where an image is formed by shuttle scanning of the recording paper 216 with a print head 250 can also be converted to an imaginary line head, and the algorithm of the present invention may also be applied in such cases.

In FIGS. 28A and 28B, constituent parts which are the same as or similar to those in FIGS. 26A and 26B are denoted with the same reference numerals and description thereof is omitted here.

In FIGS. 28A and 28B, the print head 250 is disposed with its lengthwise direction (nozzle alignment direction) in line with the conveyance direction of the recording paper 216 (the media feed direction indicated by the arrow 254), and the recording paper 216 is scanned with the print head 250 in a direction substantially perpendicular to the media feed direction.

By combining the scanning action of the print head 250 and movement of the recording medium 216, an image is formed on the recording medium 216 by performing a plurality of scans while changing the relative positions of the recording medium 216 and the print head 250.

In the foregoing embodiments, the inkjet recording apparatus is described as one embodiment of the image forming apparatus, but the range of application of the present invention is not limited to this. The present invention can also be applied to image forming apparatuses based on various types of methods other than an inkjet method, such as a thermal transfer recording apparatus using a line head (an apparatus using thermal elements as recording elements), an LED (light-emitting diode) electrophotographic printer, a silver halide photographic type printer having an LED line exposure head (an apparatus using LED elements as recording elements), or the like.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image processing method, comprising:
    a recording failure position determination step of determining a recording failure position on an image corresponding to a malfunctioning recording element;
    a basic threshold value matrix storage step of storing a basic threshold value matrix set with threshold values used for halftoning of converting multiple-value input image data into dot data of a number of tonal graduations smaller than that of the multiple-value input image data by quantizing the multiple-value input image data;
    a sub-matrix storage step of storing a plurality of sub-matrices in association with recording failure positions in the basic threshold value matrix, each of the sub-matrices being set with threshold values which are substituted for the threshold values in a partial region of the basic threshold value matrix, the partial region including a pixel position corresponding to the recording failure position and having a width of a prescribed number of pixels;
    a replacement region determination step of determining a corresponding region with the width of the prescribed number of pixels including the recording failure position in the basic threshold value matrix, according to the pixel position in the input image data and the recording failure position determined in the recording failure position determination step;
    a sub-matrix selection step of selecting one of the sub-matrices stored in the sub-matrix storage step to use for substituting for the corresponding region determined in the replacement region determination step;
    a threshold value replacement step of creating a reformed threshold value matrix by replacing the threshold values of the corresponding region including the recording failure position in the basic threshold value matrix, with the one of the sub-matrices selected in the sub-matrix selection step; and
    a quantization processing step of quantizing the input image data by selectively using the basic threshold value matrix and the reformed threshold value matrix.

2. The image processing method as defined in claim 1, wherein:
    the basic threshold value matrix has blue noise characteristics; and
    the width of the prescribed number of pixels of the sub-matrices is set in a range of 3 through 9 pixels.

3. A sub-matrix creating method of creating the sub-matrix used in the image processing method as defined in claim 1, the sub-matrix creating method comprising:
    a sub-matrix region setting step of setting a partial region of the basic threshold value matrix including a recording failure position and having the width of the prescribed number of pixels, as a region to be replaced with the sub-matrix;
    an evaluation value calculation step of calculating an evaluation value of density distribution observed in a dot arrangement obtained by combining a dot arrangement corresponding to the sub-matrix and a dot arrangement corresponding to non-replaced regions of the basic threshold value matrix which are not replaced with the sub-matrix, in a process of settling the threshold values of the sub-matrix by successively determining the dot arrangement of positions in the sub-matrix other than the recording failure position;

a dot arrangement settlement step of settling a dot arrangement to be added by using the evaluation values obtained in the evaluation value calculation step; and a threshold value input step of setting the threshold values corresponding to positions of added dots within the sub-matrix, according to the dot arrangement settled in the dot arrangement settlement step.

4. A tangible computer readable medium having embodied thereon an image processing program for performing by a computer, the image processing program comprising:

a first code segment for a recording failure position determination step of determining a recording failure position on an image corresponding to a malfunctioning recording element;

a second code segment for a basic threshold value matrix storage step of storing a basic threshold value matrix set with threshold values used for halftoning of converting multiple-value input image data into dot data of a number of tonal graduations smaller than that of the multiple-value input image data by quantizing the multiple-value input image data;

a third code segment for a sub-matrix storage step of storing a plurality of sub-matrices in association with recording failure positions in the basic threshold value matrix, each of the sub-matrices being set with threshold values which are substituted for the threshold values in a partial region of the basic threshold value matrix, the partial region including a pixel position corresponding to the recording failure position and having a width of a prescribed number of pixels;

a fourth code segment for a replacement region determination step of determining a corresponding region with the width of the prescribed number of pixels including the recording failure position in the basic threshold value matrix, according to the pixel position in the input image data and the recording failure position determined in the recording failure position determination step;

a fifth code segment for a sub-matrix selection step of selecting one of the sub-matrices stored in the sub-matrix storage step to use for substituting for the corresponding region determined in the replacement region determination step;

a sixth code segment for a threshold value replacement step of creating a reformed threshold value matrix by replacing the threshold values of the corresponding region including the recording failure position in the basic threshold value matrix, with the one of the sub-matrices selected in the sub-matrix selection step; and a seventh code segment for a quantization processing step of quantizing the input image data by selectively using the basic threshold value matrix and the reformed threshold value matrix.

5. The tangible computer readable medium as defined in claim 4, wherein:

the basic threshold value matrix has blue noise characteristics; and the width of the prescribed number of pixels of the sub-matrices is set in a range of 3 through 9 pixels.

6. A tangible computer readable medium having embodied thereon a sub-matrix creating program for performing, by a computer, creation of the sub-matrix used in the image processing program embodied on the computer readable medium as defined in claim 4, the sub-matrix creating program comprising:

an eighth code segment for a sub-matrix region setting step of setting a partial region of the basic threshold value matrix including a recording failure position and having the width of the prescribed number of pixels, as a region to be replaced with the sub-matrix;

a ninth code segment for an evaluation value calculation step of calculating an evaluation value of density distribution observed in a dot arrangement obtained by combining a dot arrangement corresponding to the sub-matrix and a dot arrangement corresponding to non-replaced regions of the basic threshold value matrix which are not replaced with the sub-matrix, in a process of settling the threshold values of the sub-matrix by successively determining the dot arrangement of positions in the sub-matrix other than the recording failure position;

a tenth code segment for a dot arrangement settlement step of settling a dot arrangement to be added by using the evaluation values obtained in the evaluation value calculation step; and an eleventh code segment for a threshold value input step of setting the threshold values corresponding to positions of added dots within the sub-matrix, according to the dot arrangement settled in the dot arrangement settlement step.

7. An image processing apparatus, comprising:

a recording failure position determination device which determines a recording failure position on an image corresponding to a malfunctioning recording element;

a basic threshold value matrix storage device which stores a basic threshold value matrix set with threshold values used for halftoning of converting multiple-value input image data into dot data of a number of tonal graduations smaller than that of the multiple-value input image data by quantizing the multiple-value input image data;

a sub-matrix storage device which stores a plurality of sub-matrices in association with recording failure positions in the basic threshold value matrix, each of the sub-matrices being set with threshold values which are substituted for the threshold values in a partial region of the basic threshold value matrix, the partial region including a pixel position corresponding to the recording failure position and having a width of a prescribed number of pixels;

a replacement region determination device which determines a corresponding region with the width of the prescribed number of pixels including the recording failure position in the basic threshold value matrix, according to the pixel position in the input image data and the recording failure position determined by the recording failure position determination device;

a sub-matrix selection device which selects one of the sub-matrices to use for substituting for the corresponding region determined by the replacement region determination device;

a threshold value replacement device which creates a reformed threshold value matrix by replacing the threshold values of the corresponding region including the recording failure position in the basic threshold value matrix, with the one of the sub-matrices selected by the sub-matrix selection device; and a quantization processing device which quantizes the input image data by selectively using the basic threshold value matrix and the reformed threshold value matrix.

8. A sub-matrix creating method of creating the sub-matrix used in the image processing apparatus as defined in claim 7, the sub-matrix creating method comprising:

a sub-matrix region setting step of setting a partial region of the basic threshold value matrix including a recording failure position and having the width of the prescribed number of pixels, as a region to be replaced with the sub-matrix;

an evaluation value calculation step of calculating an evaluation value of density distribution observed in a dot arrangement obtained by combining a dot arrangement corresponding to the sub-matrix and a dot arrangement corresponding to non-replaced regions of the basic threshold value matrix which are not replaced with the sub-matrix, in a process of settling the threshold values of the sub-matrix by successively determining the dot arrangement of positions in the sub-matrix other than the recording failure position;

a dot arrangement settlement step of settling a dot arrangement to be added by using the evaluation values obtained in the evaluation value calculation step; and a threshold value input step of setting the threshold values corresponding to positions of added dots within the sub-matrix, according to the dot arrangement settled in the dot arrangement settlement step.

9. A tangible computer readable medium having embodied thereon a sub-matrix creating program for performing, by a computer, creation of the sub-matrix used in the image processing apparatus as defined in claim 7, the sub-matrix creating program comprising:

a first code segment for a sub-matrix region setting step of setting a partial region of the basic threshold value matrix including a recording failure position and having the width of the prescribed number of pixels, as a region to be replaced with the sub-matrix;

a second code segment for an evaluation value calculation step of calculating an evaluation value of density distribution observed in a dot arrangement obtained by combining a dot arrangement corresponding to the sub-matrix and a dot arrangement corresponding to non-replaced regions of the basic threshold value matrix which are not replaced with the sub-matrix, in a process of settling the threshold values of the sub-matrix by successively determining the dot arrangement of positions in the sub-matrix other than the recording failure position;

a third code segment for a dot arrangement settlement step of settling a dot arrangement to be added by using the evaluation values obtained in the evaluation value calculation step; and a fourth code segment for a threshold value input step of setting the threshold values corresponding to positions of added dots within the sub-matrix, according to the dot arrangement settled in the dot arrangement settlement step.

10. A threshold value matrix creating method, comprising:

a basic threshold value matrix storage step of storing a basic threshold value matrix set with threshold values used for halftoning of converting multiple-value input image data into dot data of a number of tonal graduations smaller than that of the multiple-value input image data by quantizing the multiple-value input image data;

a sub-matrix storage step of storing a plurality of sub-matrices in association with recording failure positions in the basic threshold value matrix, each of the sub-matrices being set with threshold values which are substituted for the threshold values in a partial region of the basic threshold value matrix having a width of a prescribed number of pixels including a pixel position corresponding to a position of a malfunctioning recording element;

a sub-matrix selection step of selecting at least one of the sub-matrices stored in the sub-matrix storage step; and a threshold value replacement step of creating a reformed threshold value matrix by replacing the threshold values of a partial region of the basic threshold value matrix with the sub-matrix selected in the sub-matrix selection step, the partial region including the recording failure position and having a width of a prescribed number of pixels.

11. A sub-matrix creating method of creating the sub-matrix used in the threshold value matrix creating method as defined in claim 10, the sub-matrix creating method comprising:

a sub-matrix region setting step of setting a partial region of the basic threshold value matrix including a recording failure position and having the width of the prescribed number of pixels, as a region to be replaced with the sub-matrix;

an evaluation value calculation step of calculating an evaluation value of density distribution observed in a dot arrangement obtained by combining a dot arrangement corresponding to the sub-matrix and a dot arrangement corresponding to non-replaced regions of the basic threshold value matrix which are not replaced with the sub-matrix, in a process of settling the threshold values of the sub-matrix by successively determining the dot arrangement of positions in the sub-matrix other than the recording failure position;

a dot arrangement settlement step of settling a dot arrangement to be added by using the evaluation values obtained in the evaluation value calculation step; and a threshold value input step of setting the threshold values corresponding to positions of added dots within the sub-matrix, according to the dot arrangement settled in the dot arrangement settlement step.

12. A tangible computer readable medium having embodied thereon a threshold value matrix creating program for performing by a computer, the threshold value matrix creating program comprising:

a first code segment for a basic threshold value matrix storage step of storing a basic threshold value matrix set with threshold values used for halftoning of converting multiple-value input image data into dot data of a number of tonal graduations smaller than that of the multiple-value input image data by quantizing the multiple-value input image data;

a second code segment for a sub-matrix storage step of storing a plurality of sub-matrices in association with recording failure positions in the basic threshold value matrix, each of the sub-matrices being set with threshold values which are substituted for the threshold values in a partial region of the basic threshold value matrix having a width of a prescribed number of pixels including a pixel position corresponding to a position of a malfunctioning recording element;

a third code segment for a sub-matrix selection step of selecting at least one of the sub-matrices stored in the sub-matrix storage step; and a fourth code segment for a threshold value replacement step of creating a reformed threshold value matrix by replacing the threshold values of a partial region of the basic threshold value matrix with the sub-matrix selected in the sub-matrix selection step, the partial region including the recording failure position and having a width of a prescribed number of pixels.

13. A tangible computer readable medium having embodied thereon a sub-matrix creating program for performing, by a computer, creation of the sub-matrix used in the threshold value matrix creating program embodied on the computer readable medium as defined in claim 12, the sub-matrix creating program comprising:

a fifth code segment for a sub-matrix region setting step of setting a partial region of the basic threshold value matrix including a recording failure position and having the width of the prescribed number of pixels, as a region to be replaced with the sub-matrix;

a sixth code segment for an evaluation value calculation step of calculating an evaluation value of density distribution observed in a dot arrangement obtained by combining a dot arrangement corresponding to the sub-matrix and a dot arrangement corresponding to non-replaced regions of the basic threshold value matrix which are not replaced with the sub-matrix, in a process of settling the threshold values of the sub-matrix by successively determining the dot arrangement of positions in the sub-matrix other than the recording failure position;

a seventh code segment for a dot arrangement settlement step of settling a dot arrangement to be added by using the evaluation values obtained in the evaluation value calculation step; and an eighth code segment for a threshold value input step of setting the threshold values corresponding to positions of added dots within the sub-matrix, according to the dot arrangement settled in the dot arrangement settlement step.

14. An image forming apparatus, comprising:

a recording head in which a plurality of recording elements are arranged;

a conveyance device which causes the recording head and a recording medium to move relatively to each other by conveying at least one of the recording head and the recording medium;

a recording failure position determination device which determines a recording failure position on an image corresponding to at least one of the recording elements that is malfunctioning in the recording head;

a basic threshold value matrix storage device which stores a basic threshold value matrix set with threshold values used for halftoning of converting multiple-value input image data into dot data of a number of tonal graduations smaller than that of the multiple-value input image data by quantizing the multiple-value input image data;

a sub-matrix storage device which stores a plurality of sub-matrices in association with recording failure positions in the basic threshold value matrix, each of the sub-matrices being set with threshold values which are substituted for the threshold values in a partial region of the basic threshold value matrix, the partial region including a pixel position corresponding to the recording failure position and having a width of a prescribed number of pixels;

a replacement region determination device which determines a corresponding region with the width of the prescribed number of pixels including the recording failure position in the basic threshold value matrix, according to the pixel position in the input image data and the recording failure position determined by the recording failure position determination device;

a sub-matrix selection device which selects one of the sub-matrices to use for substituting for the corresponding region determined by the replacement region determination device;

a threshold value replacement device which creates a reformed threshold value matrix by replacing the threshold values of the corresponding region including the recording failure position in the basic threshold value matrix, with the one of the sub-matrices selected by the sub-matrix selection device;

a quantization processing device which generates the dot data by quantizing the input image data by selectively using the basic threshold value matrix and the reformed threshold value matrix; and a recording control device which controls driving of the recording elements in the recording head, according to the dot data generated by the quantization processing device.

15. A sub-matrix creating method of creating the sub-matrix used in the image forming apparatus as defined in claim 14, the sub-matrix creating method comprising:

a sub-matrix region setting step of setting a partial region of the basic threshold value matrix including a recording failure position and having the width of the prescribed number of pixels, as a region to be replaced with the sub-matrix;

an evaluation value calculation step of calculating an evaluation value of density distribution observed in a dot arrangement obtained by combining a dot arrangement corresponding to the sub-matrix and a dot arrangement corresponding to non-replaced regions of the basic threshold value matrix which are not replaced with the sub-matrix, in a process of settling the threshold values of the sub-matrix by successively determining the dot arrangement of positions in the sub-matrix other than the recording failure position;

a dot arrangement settlement step of settling a dot arrangement to be added by using the evaluation values obtained in the evaluation value calculation step; and a threshold value input step of setting the threshold values corresponding to positions of added dots within the sub-matrix, according to the dot arrangement settled in the dot arrangement settlement step.

16. A tangible computer readable medium having embodied thereon a sub-matrix creating program for performing, by a computer, creation of the sub-matrix used in the image forming apparatus as defined in claim 14, the sub-matrix creating program comprising:

a first code segment for a sub-matrix region setting step of setting a partial region of the basic threshold value matrix including a recording failure position and having the width of the prescribed number of pixels, as a region to be replaced with the sub-matrix;

a second code segment for an evaluation value calculation step of calculating an evaluation value of density distribution observed in a dot arrangement obtained by combining a dot arrangement corresponding to the sub-matrix and a dot arrangement corresponding to non-replaced regions of the basic threshold value matrix which are not replaced with the sub-matrix, in a process of settling the threshold values of the sub-matrix by successively determining the dot arrangement of positions in the sub-matrix other than the recording failure position;

a third code segment for a dot arrangement settlement step of settling a dot arrangement to be added by using the evaluation values obtained in the evaluation value calculation step; and a fourth code segment for a threshold value input step of setting the threshold values corresponding to positions of added dots within the sub-matrix, according to the dot arrangement settled in the dot arrangement settlement step.

* * * * *